United States Patent [19]
Yasutake

[11] Patent Number: 5,483,261
[45] Date of Patent: Jan. 9, 1996

[54] GRAPHICAL INPUT CONTROLLER AND METHOD WITH REAR SCREEN IMAGE DETECTION

[75] Inventor: Taizo Yasutake, Cupertino, Calif.

[73] Assignee: ITU Research, Inc., Cupertino, Calif.

[21] Appl. No.: 141,045

[22] Filed: Oct. 26, 1993

Related U.S. Application Data

[63] Continuation-in-part of Ser. No. 837,372, Feb. 14, 1992, abandoned.

[51] Int. Cl.[6] ............................................. G09G 3/07
[52] U.S. Cl. ........................... 345/173; 178/18; 345/158
[58] Field of Search ...................... 178/18, 19; 345/157, 345/158, 173, 175

[56] References Cited

U.S. PATENT DOCUMENTS

| | | | |
|---|---|---|---|
| 3,761,877 | 9/1973 | Fernald | 178/19 X |
| 4,990,900 | 2/1991 | Kikuchi | 178/18 X |
| 5,025,314 | 6/1991 | Tang et al. | 178/18 X |
| 5,086,197 | 2/1992 | Liou | 178/18 |
| 5,107,541 | 4/1992 | Hilton | 178/18 X |

OTHER PUBLICATIONS

Krueger Myron, *Artificial Reality*, Addison–Wesley Publishing Co., Jan. 31, 1983, pp. 18–28 and 55–69.

*Primary Examiner*—Ulysses Weldon
*Attorney, Agent, or Firm*—Fenwick & West

[57] ABSTRACT

An interactive graphics system includes a touch-sensitive controller having a number of semi-transparent light-diffusing panels imaged by a rear mounted imaging device such as a video camera. The imaging device is arranged to detect the shadows of objects, such as fingers, touching any of the panels. The camera can simultaneously to detect multiple touch points on the panels resulting from the touch of multiple fingers, which facilitates the detection of input gestures. The panel and the position on the panel touched can be determined by the position of the shadow on the video image. As the imaging device is only required to detect the existence of shadows on the panels, only a two-dimensional image must be processed. However, since the imaging device can image multiple panels simultaneously, a multi-dimensional input signal can be provided. Further, as this image is of high contrast, only light/dark areas must be differentiated for greatly simplified image processing.

12 Claims, 20 Drawing Sheets

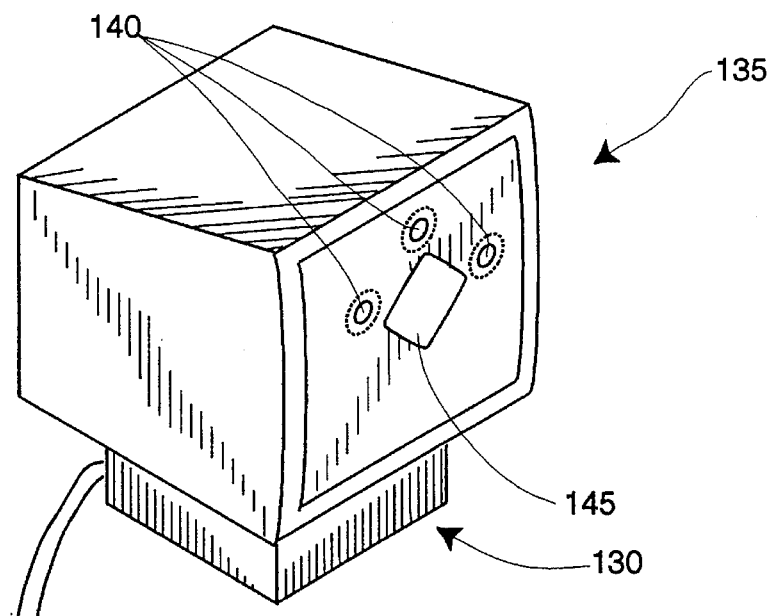
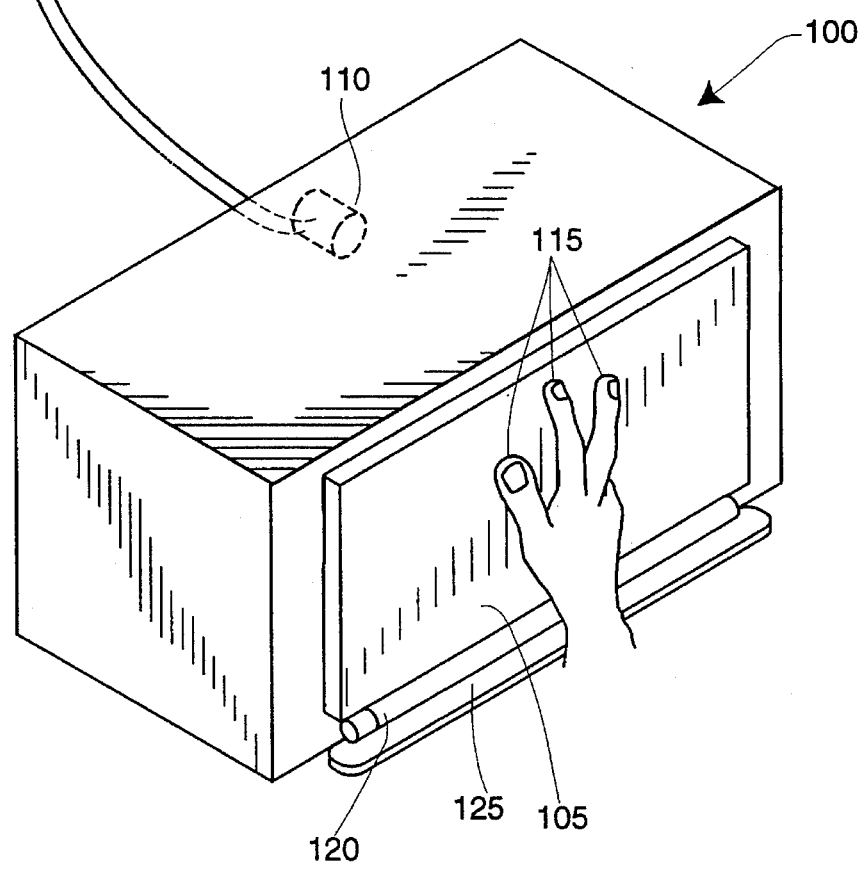
FIGURE 1

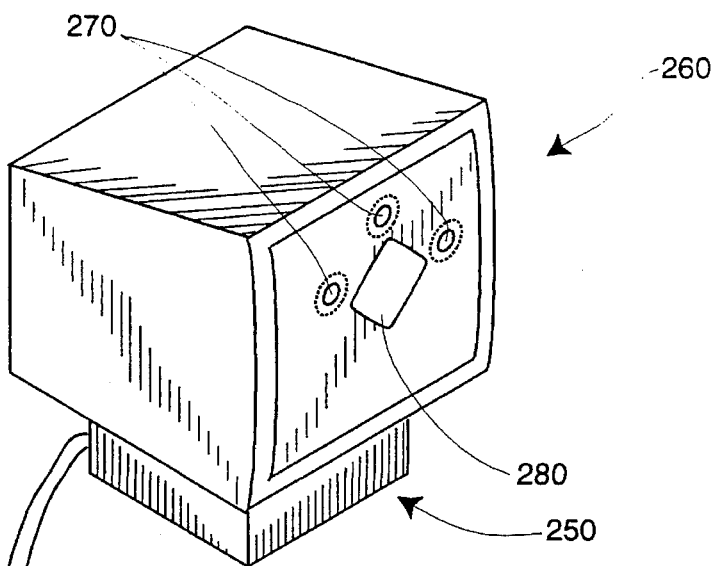
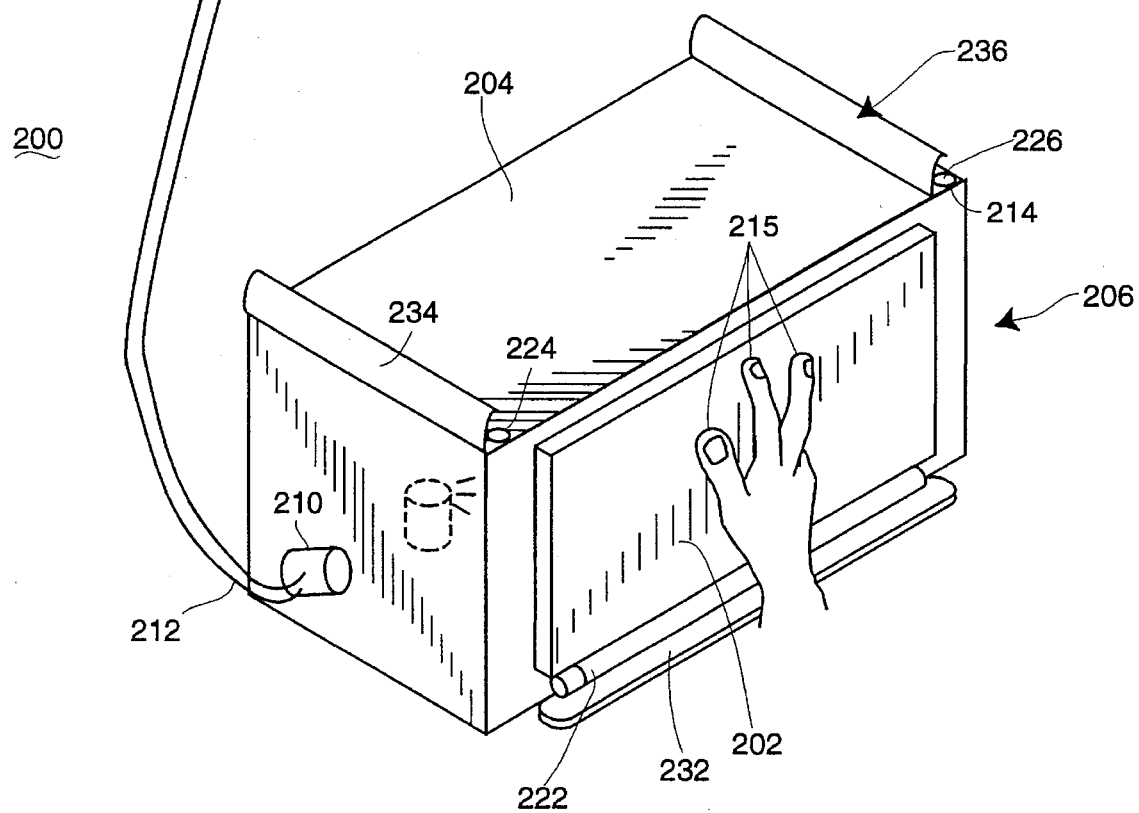
FIGURE 2

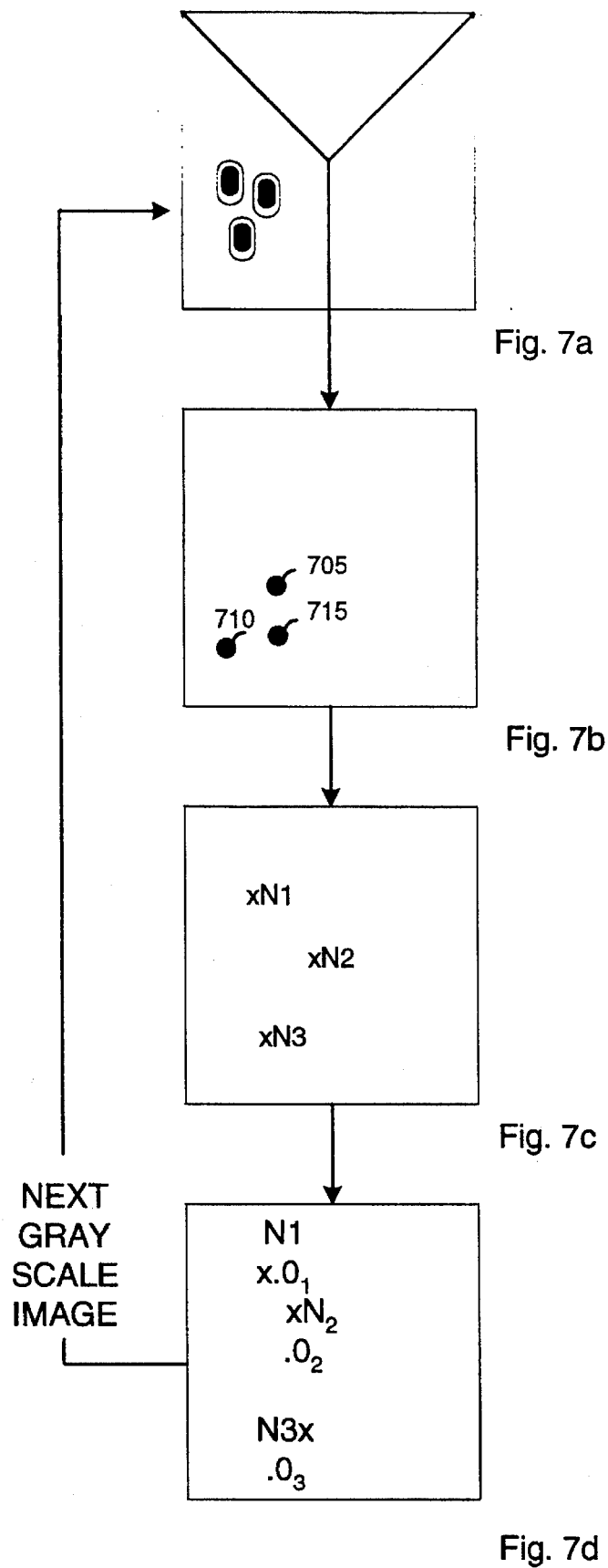

TWO DIMENSIONAL
OF CCD IMAGE

TWO DIMENSIONAL
DISPLAY SPACE ON
CRT MONITOR

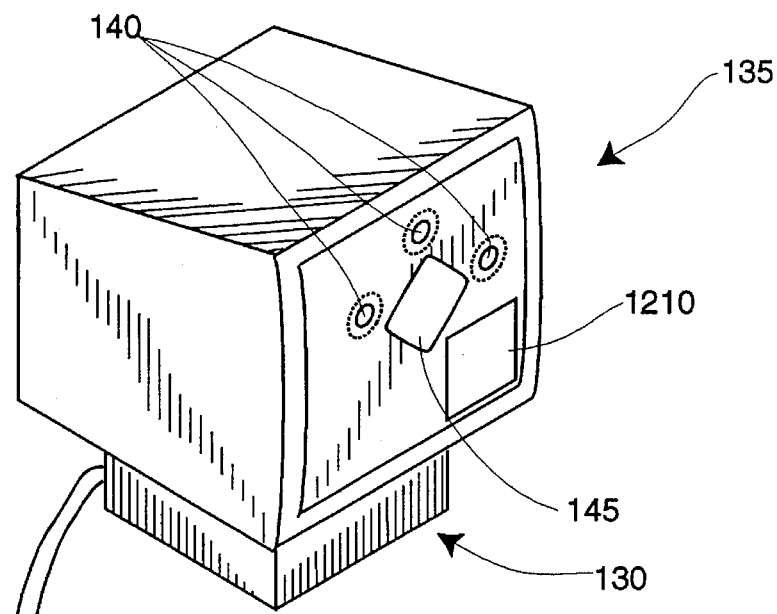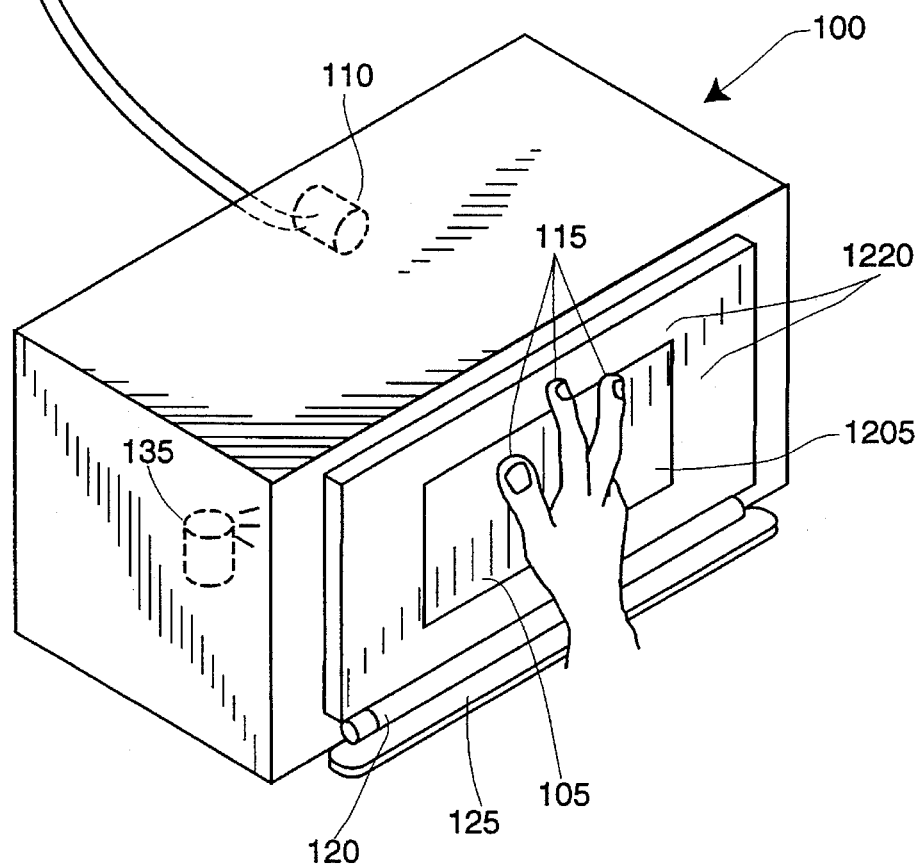
FIGURE 12

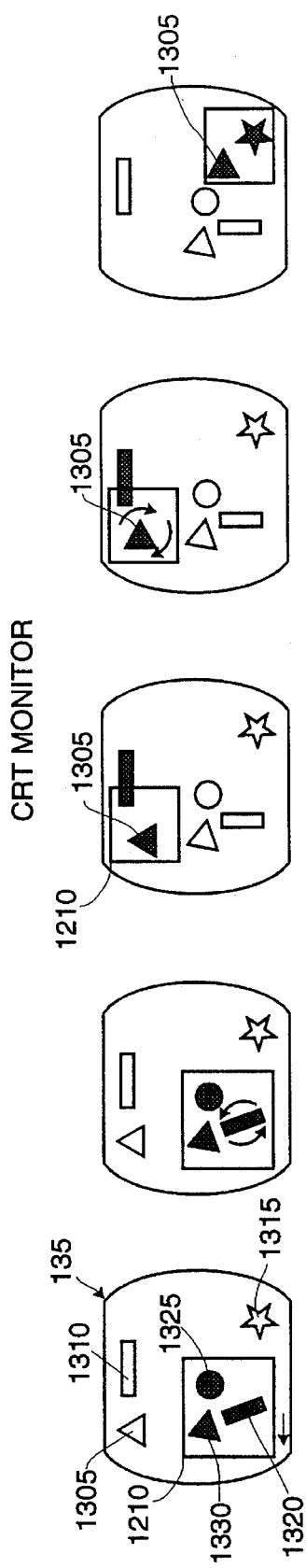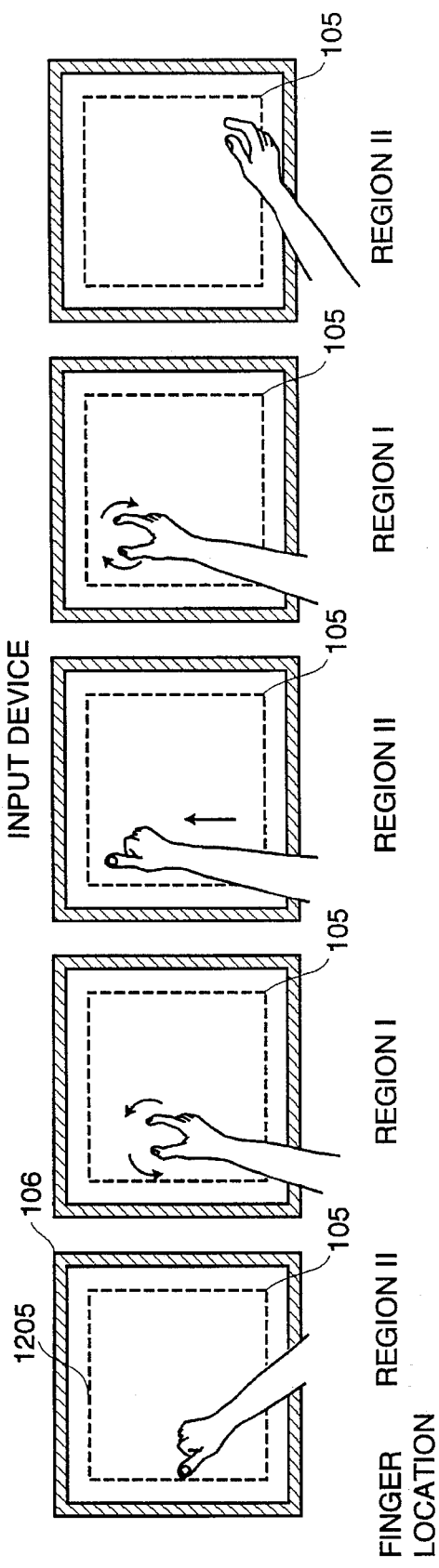

| ROTATION COMMAND | FINGER MOVEMENT | IMAGE OBTAINED BY CCD CAMERA (Z.D.) |
|---|---|---|
| ROTATION ABOUT Y AXIS | 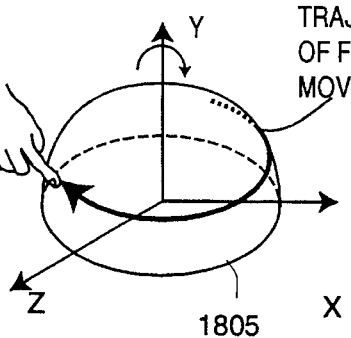 TRAJECTORY OF FINGER MOVEMENT 1805 FIGURE 17c | 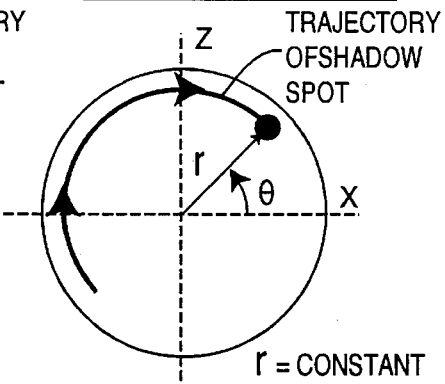 TRAJECTORY OF SHADOW SPOT r = CONSTANT θ = CHANGE FIGURE 17d |
| ROTATION ABOUT X AXIS | 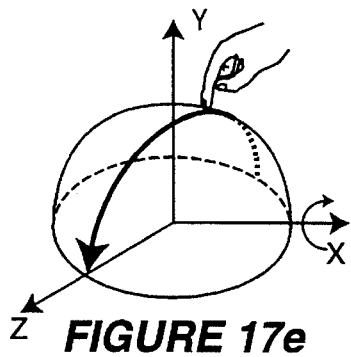 FIGURE 17e | 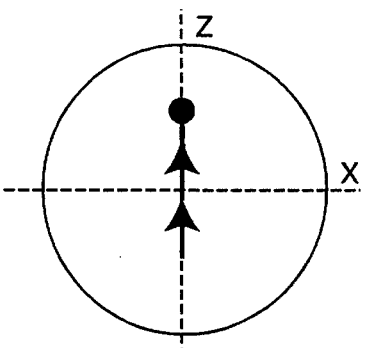 r = CHANGE θ = CONSTANT (= 0°) FIGURE 17f |
| ROTATION ABOUT Z AXIS | 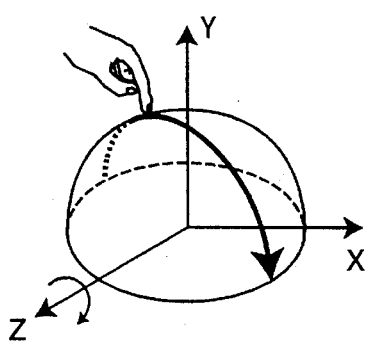 FIGURE 17g | 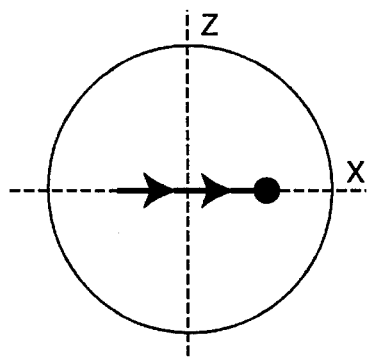 r = CHANGE θ = CONSTANT (= 90°) FIGURE 17h |

| ROTATION COMMAND | FINGER MOVEMENT | CAMERA IMAGE (2D) |
|---|---|---|

ROTATION ABOUT Z' AXIS (ANGLE ɸ IS ARBITRARY)

r = CHANGE
θ = CONSTANT (= 90 DEGREES + ɸ)

SPIRAL

SIMULTANEOUS ROTATION ABOUT Z AXIS, X AXIS, AND Y AXIS r = CHANGE
θ = CHANGE

GRAPHICAL INPUT CONTROLLER AND METHOD WITH REAR SCREEN IMAGE DETECTION

REFERENCE TO ORIGINAL APPLICATION

This application is a continuation-in-part of patent application Ser. No. 07/837,371 filed Feb. 14, 1992 now abandoned.

BACKGROUND OF THE INVENTION

1. Field

The present invention relates to the field of graphical input devices for interactive computer graphics. More specifically, the present invention relates to the rear screen video detection of multiple objects, such as fingers, on a semi-transparent touch screen used to control interactive computer graphics.

2. Art Background

Broadly, graphical input devices for interactive computer graphics sense the actions of a user. Most such graphical input devices are manipulated by the user. These include the devices commonly associated with personal computers, such as light pens, mice, joysticks, track balls, and keyboards. However, there are also a number of devices that directly sense the actions of a user. Touchscreens with sensors in the display screen are one example of such devices. Myron W. Krueger discloses a number of other devices in his book *Artificial Reality II*, 1991, that use video cameras to detect the position of a user's hand or body in free space. The VIDEODESK concept described in Krueger's book is also described in U.S. Pat. No. 4,843,568, titled Real Time Perception of and Response to the Actions of an Unencumbered Participant/User, issued to Myron W. Krueger, Katrin Hinrichsen and Thomas S. Gionfriddo Jun. 27, 1989. However, this device requires the user to place his hands on a backlit screen mounted on the upper surface of a desk within the view of an overhead video camera and requires the camera's view of the hands to be unimpeded. As a result, the controller is burdensome and bulky.

The drawing prism presented by Richard Greene at the 1985 SIGGRAPH in San Francisco uses a large transparent prism as a drawing surface. As described in *"The Drawing Prism: A versatile Graphic Input Device,"* Richard Greene, ACM Volume 19, Number 3, 1985, pages 103–110, and in U.S. Pat. No. 4,561,017, titled Graphic Input Apparatus, issued Dec. 24, 1985, , a video camera is arranged to view that surface from an angle such that it can only image the points of optical contact between drawing tools and the surface. However, this device is based on the refraction and total internal reflection of light at a dielectric surface and requires rather precise and expensive optical components and alignment.

Another camera-based system is the Sensor Frame of Sensor Frame Corporation. The Sensor Frame controller uses multiple cameras with intersecting fields-of-view to detect multiple light-occluding objects within a frame. This device is described in U.S. Pat. No. 4,746,770 titled Method and Apparatus for Isolating and Manipulating Graphics Objects on Computer Video Monitor, issued to Paul McAvinney on May 24, 1988. This apparatus is capable of simultaneously detecting the positions of multiple fingers. However, it requires multiple cameras to detect the positions of objects. Further, the device has certain problems with "ghost" images when multiple objects are detected.

It is desirable to provide a graphics input device that provides free-form inputs, commonly referred to as gestures, which directly senses the actions of a user without impeding or otherwise restricting a user by requiring him to wear or hold a device. It is further desirable that the device can sense simultaneous multiple inputs. Further, it is desirable to provide such a system that reduces the requirements of image processing so that it can be implemented real-time on a commonly available computer system. Finally, it is desirable to provide a system that can provide an input suitable for controlling a multi-dimensional application, such as a three-dimensional graphics application.

SUMMARY OF THE INVENTION

A graphics system in accordance with the preferred embodiment of the invention includes one or more semi-transparent screens with a rear mounted video camera. The camera is arranged to detect the shadows of objects, such as fingers, touching the screens. These shadows are referred to as "touch points." This provides for a simple two-dimensional input image, which greatly simplifies the image processing required. Specifically, as the camera is only required to detect the existence of shadows on the screens, only a two-dimensional image needs to be processed. Further, as the light/dark areas are easily differentiated, image processing is further simplified. The graphics system also provides an unimpeded environment for the user. The camera is used to detect multiple touch points resulting from the touch of multiple fingers on the screens. This provides for the input of a multiplicity of gesture commands. As a result, a practical, convenient and intuitive system is provided that can directly sense multiple finger touches and gestures without placing any restrictions on the users actions. Finally, force-sensitive sensors are used to mount the screens to the enclosure so as to sense forces applied to the screens and to provide an alternative "z" input capability for use in moving and manipulating display objects.

These and other advantages and features of the invention will become readily apparent to those skilled in the art after reading the following detailed description of the preferred embodiment of the present invention and studying the accompanying drawings.

BRIEF DESCRIPTION OF THE DRAWINGS

FIG. 1 is a perspective view of a rear-screen video graphics input controller having and an interactive computer graphics system including a display in accordance with the preferred embodiment of the invention.

FIG. 2 is a perspective view of an alternative graphics input controller having multiple rear-screen video control surfaces and a interactive computer graphics system including a display.

FIG. 7a–7d illustrates the steps of FIG. 5 in a image format.

FIG. 12 illustrates a new input control technique for use with the graphical control devices taught herein, such as controller 100 illustrates in FIG. 1.

FIGS. 13a–14c illustrate the operation of the interface technique of FIG. 12.

FIGS. 14a–14c illustrate a cylindrical controller built in accordance with the present invention. FIG. 14a is a perspective view, FIG. 14b is a vertical cross-sectional view, and FIG. 14c is a top view.

FIGS. 17b–17l illustrate the generation of rotation commands using the controller of FIG. 17a.

DETAILED DESCRIPTION OF THE PREFERRED EMBODIMENT

Figure 3:
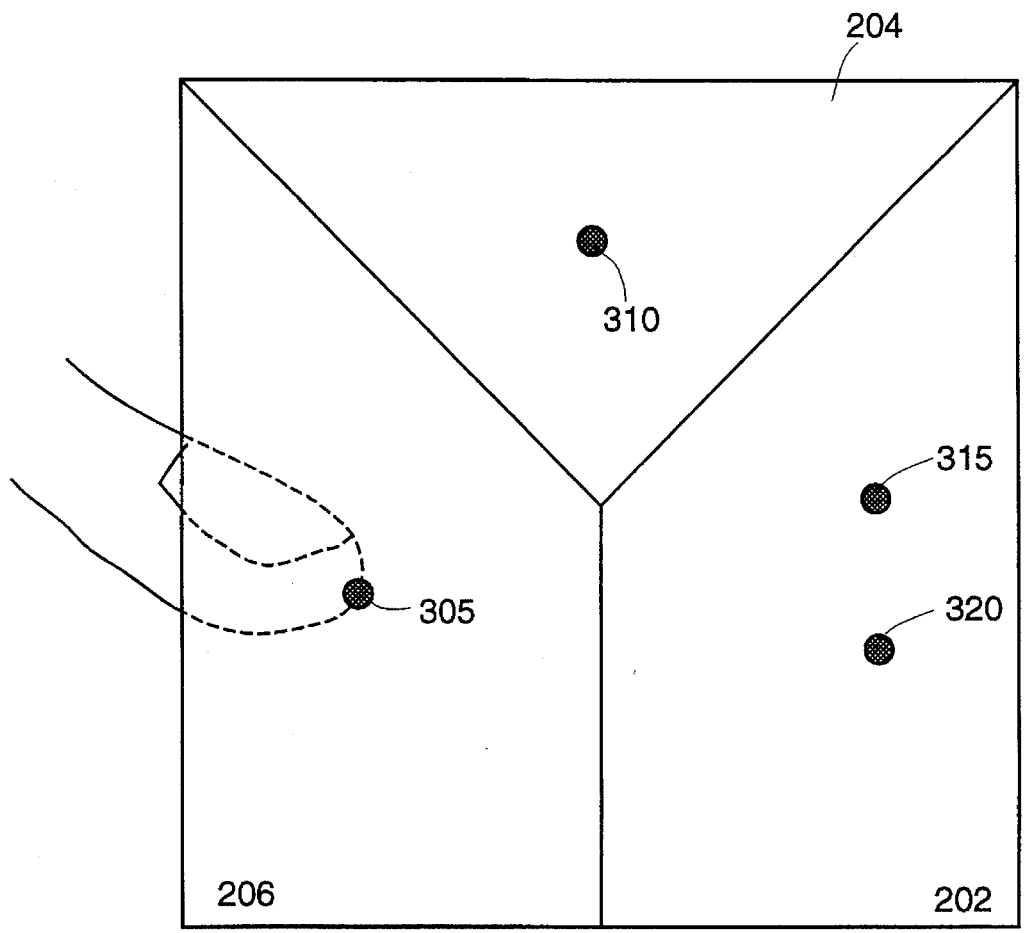
FIG. 3 illustrates the image space, or the image captured by the CCD camera of FIG. 2, FIGS. 4a–c illustrate control gestures on the controller of FIG. 2 and the resulting displays on the display of FIG. 2.

One preferred embodiment of the present invention is illustrated in FIG. 1. As illustrated, a controller 100 is generally configured in the shape of a cube. Of course, this shape could vary widely to conform to the needs of any given application. However, I prefer this use of a cube as a controller for use with a standard Cartesian coordinate system. Controller 100 is generally an opaque enclosure except for a semi-transparent panel 105. Semi-transparent panel 105 is preferably flat, but could be otherwise shaped for other applications. A compact CCD camera 110 is mounted within controller 100 and is oriented and focused on panel 105 so as to detect the shadows of objects, such as fingers, touching panel 105.

Semi-transparent panel 105 allows some light through, but does not generally allow through the images of background objects. Thus, it diffuses light and generally provides a uniform gray image to CCD camera 110. However, if a user touches an area or areas of panel 105, the areas touched by his fingers appear black to CCD camera 110 and can be readily distinguished from untouched areas of panel 105, which is illuminated by ambient light. The areas touched by the user thus are identified as control objects 115.

Further illumination can be provided in order to augment the illumination of panel 105. For example, FIG. 1 illustrates a light source 120 disposed outside of controller 100. A mirror 125 is mounted to controller 100 and oriented so as to generally illuminate panel 105. Since CCD camera 110 distinguishes light from dark areas on the back of panel 105, it is desirable to uniformly illuminate panel 105 from the front. Accordingly, mirror 125 is configured to generally provide a diffuse light on the front surface of panel 105.

CCD camera 110 is coupled to an image processing computer 130 which converts the image obtained from CCD camera 110 into graphical inputs for an interactive computer system. These inputs, which may simultaneously include the positions of multiple control objects 115 (finger touch points), are used to manipulate display objects on a graphics display 135. For example, graphics display 135 can display objects, such as display objects 140, that correspond to control objects 115 on panel 105. Thus, display objects 140 move in response to movement of control objects 115 on panel 105. If the user's fingers move up on panel 105, display objects 140 on graphics display 135 move up in response. If the user's fingers rotate about a position on panel 105, display objects 140 will rotate about a position on graphics display 135 in response. Further, display objects 140 may be used to manipulate other display objects. For example, FIG. 1 illustrates display objects 140 contacting a generally square display object 145. Programming could be provided such that rotating display objects 140 while contacting display object 145 cause display object 145 to rotate, An alternative embodiment of the present invention is illustrated in FIG. 2. As illustrated, a graphics input controller 200 is generally configured in the shape of a cube and has multiple rear-screen control surfaces. Of course, this shape could be varied to conform to the needs of any given application.

Controller 200 is generally opaque except for three semi-transparent panels 202, 204 and 206. Semi-transparent panels 202, 204 and 206 are preferably flat, but could be otherwise shaped for other applications. A compact CCD camera 210 having a wide angle lens is mounted near corner 212 within controller 200 and is oriented and focused so as to detect the shadows of objects, such as fingers, touching panels 202, 204, 206. More specifically, it is preferred that camera 210 be oriented so that it is aimed at the vertex 214 that is common to panels 202, 204 and 206. The field of view of CCD camera 210 should be adequate to image panels 202, 204 and 206. For a cube, this would typically require a field-of-view of approximately 90 degrees.

In operation, the embodiment of FIG. 2 operates in much the same manner as controller 100 of FIG. 1. Specifically, semi-transparent panels 202, 204 and 206 are similar to panel 105 and allow some light through, but do not generally allow through images of background objects. Thus, the panels diffuse light and generally provides a uniform gray image to CCD camera 210. However, if a user touches an area or areas on one of the panels, such as areas of panel 202, the areas touched by his fingers appear black to CCD camera 210 and can be readily distinguished from untouched areas of panel 202 which is illuminated by ambient light. Similarly, if a user touches an area or areas on either of panels 204 or 206, the areas touched by his fingers appear black to CCD camera 210 and can be also readily distinguished from untouched areas of the panels which are illuminated by ambient light. The areas touched by the user thus are identified as control objects 215.

Further illumination can be provided in order to augment the illumination of panels 202, 204 and 206. For example, FIG. 2 illustrates a light sources 222, 224 and 226 disposed outside of controller 200. Mirrors 232, 234 and 236 are mounted to controller 200 and oriented so as to generally illuminate the semitransparent panels. Since CCD camera 210 distinguishes light from dark areas on the back of the panels, it is desirable to uniformly illuminate the panels from the front. Accordingly, mirrors 232, 234, and 236 are configured to generally provide a diffuse light on the front surface of the panels.

CCD camera 210 is coupled to image processing computer 250 which converts the image obtained from CCD camera 210 into graphical inputs for an interactive computer system. These inputs, which may simultaneously include the positions of multiple control objects 215, are used to manipulate display objects on a graphics display 260. For example, graphics display 260 can display objects that correspond to control objects 215 on panel 202. Specifically, display objects 270 move in response to movement of control objects 215 on panel 202. If the user's fingers move up on panel 202, display objects 270 on graphics display move up in response. If the user's fingers rotate about a position on panel 202, display objects 270 will rotate about a position on graphics display 260 in response. Further, display objects 270 may be used to manipulate other display objects. For example, FIG. 2 illustrates display objects 270 contacting a square display object 280. Programming could be provided such that rotating display objects 260 while contacting display object 280 causes display object 280 to rotate. Similarly, touches on panels 204 and 206 permit control of display objects in other or redundant dimensions.

As illustrated in FIG. 2, CCD camera 210 is positioned to capture images of the inside surfaces of panels 202, 204, and 206. (Panel 206 is on the back side of the cube with edges common to panels 202 and 204.) The captured images appear generally to CCD camera 210 as illustrated in FIG. 3. As illustrated, panels 202, 204, and 206 do not appear to CCD camera 210 as squares. Rather, their precise appearance depends on the shape of the panels, their orientation to the camera, the position of the camera, and the characteristics of the camera lens. However, in the preferred embodiment, the general appearance appears as illustrated in FIG. 3, with panel 204 appearing to be generally triangular in shape, panels 206 and 202 generally trapezoidal. As illustrated, control objects caused by finger touches on the panels can be imaged simultaneously, as shown by control objects 305, 310, 315 and 320.

Figure 4A:
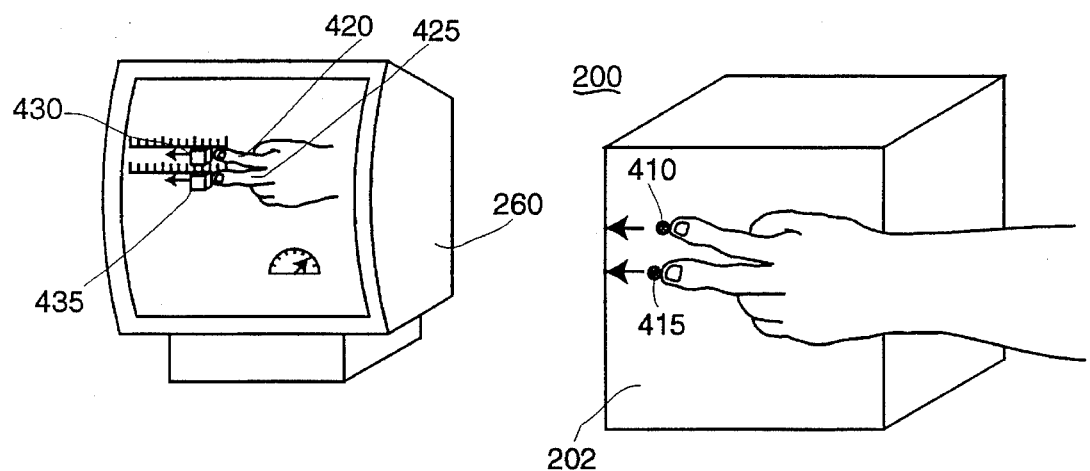
Figure 4B:
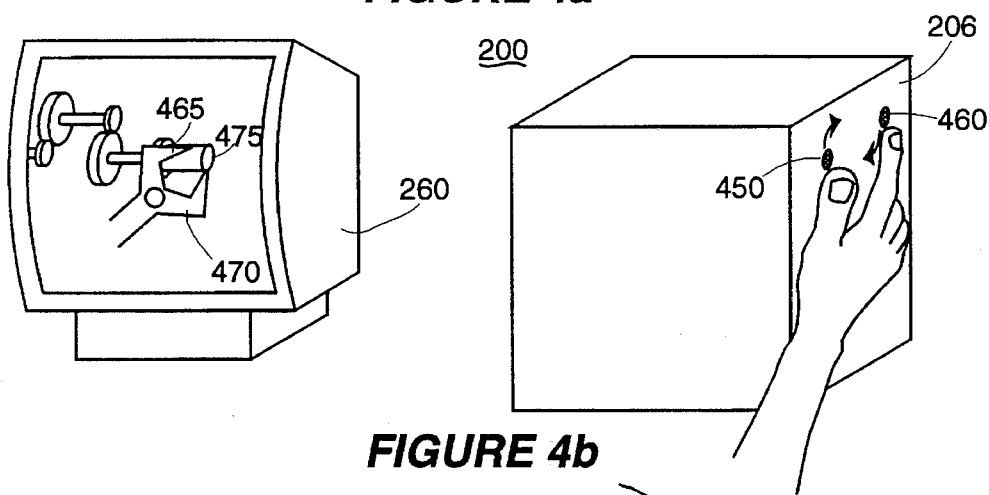
Figure 4C:
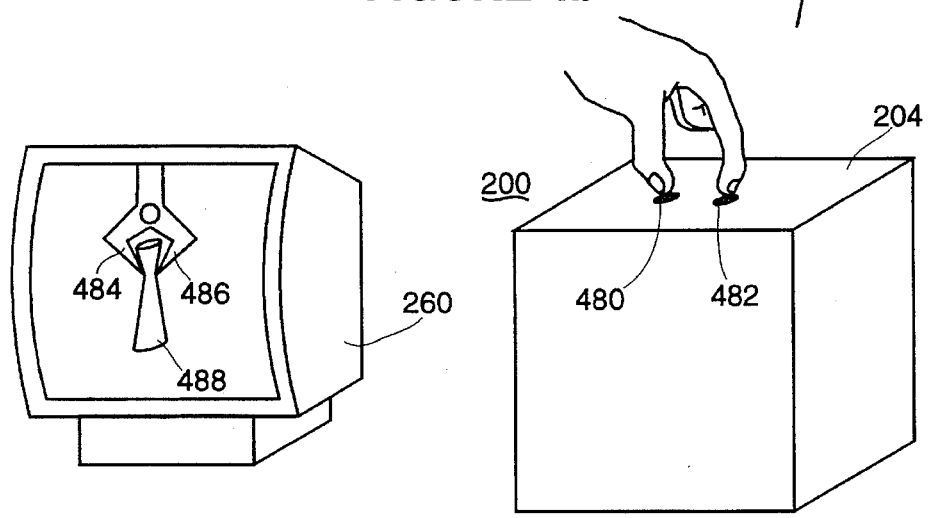

The system illustrated in FIG. 2 is capable of generating sophisticated yet intuitive commands, known as gestures, such as sliding, rotation, and grasping. The techniques for generating these commands is illustrated in FIGS. 4a–4c. Specifically, in FIG. 4a, a user slides two fingers horizontally left on panel 202. Control objects 410 and 415 correspond to the positions at which the fingers touch panel 202. Control objects 410 and 415 are imaged by CCD camera 210 and their position and movement is interpreted by computer 250. In response, computer 250 generates an image of the user's hand, including fingers 420 and 425, which moves horizontally left on graphics display 260. Movement of finger images 420 and 425 thus corresponds to movements of the users fingers. Finger images 420 and 425 are used to interact with the images of two slide switches, switches 430 and 435, to provide an intuitive interactive graphical user interface.

A three dimensional rotation command (or "gesture") is illustrated in FIG. 4b. As the user positions and rotates two fingers on panel 206, control objects 450 and 460 at which the fingers touch panel 206 are imaged by CCD camera 210 and their position and movement are interpreted by computer 250. In response, computer 250 generates an image of a rotating tool (the user's hand), including fingers 465 and 470, which rotates in the y-z plane (where x is horizontal, y is vertical, and z is into the plane of the graphics display) on graphics display 260. Movement of finger images 465 and 470 thus correspond to movements of the users fingers. This movement is used to interact with the images of a knob 475, to provide another intuitive interactive graphical user interface.

A three dimensional grasping command (or "gesture")is illustrated in FIG. 4c. As the user positions and "grasps with" his two fingers on panel 204, control objects 480 and 482 are imaged by CCD camera 210 and their position and movement is interpreted by computer 250. In response, computer 250 generates an image of a grasping tool (or the user's hand), including finger images 484 and 486, which move in the x-z plane (where x is horizontal, y is vertical, and z is into the plane of the graphics display) on graphics display 260. Movement of finger images 484 and 486 thus correspond to movements of the users fingers. This movement is used to interact with the image an object 488, to provide yet another intuitive interactive graphical user interface.

Figure 5:
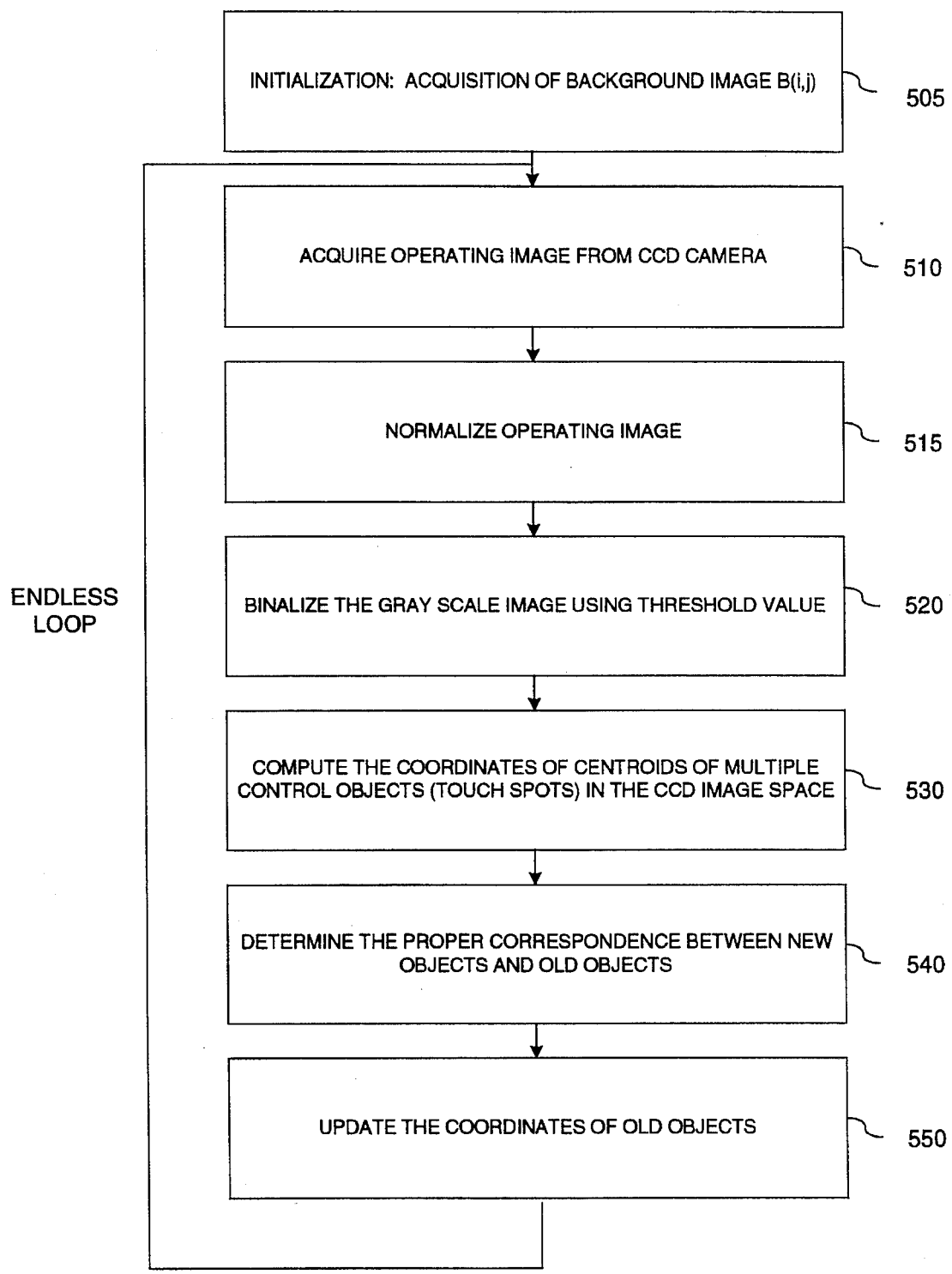
FIG. 5 is a flow chart illustrating the steps in the processing of the images obtained by the CCD camera of FIG. 2, FIG. 6 provides a functional block diagram of the system of FIG. 2.

A flow chart illustrating the processing and interpretation of the control images obtained by CCD camera 210 is provided in FIG. 5. In step 505, CCD camera 210 acquires a complete gray scale background image of the two dimensional image of the three panels, such as the one illustrated in FIG. 3. In the preferred embodiment, this is accomplished during initialization, while the user is not touching the panels, though a person skilled in the art would understand that the background image could be updated during operation. The background image is stored as a matrix of brightness values $B_0(i,j)$ in computer 250.

Next, computer 250 acquires a complete operating image from CCD camera 210 in step 510. The operating image is intended to capture the positions of control objects resulting from finger touches on the semi-transparent panels. This data is also in the form of a two dimensional gray scale image and is stored as a matrix of brightness values $X_k(i,j)$.

In step 515, the operating image is normalized by subtracting the operating image from the background image on a point-by-point basis. This produces a normalized image $Z_k(i,j)$ which is used for identification of "touch spots" or "touch points." Mathematically, the normalization step can be represented by:

$$Z_k(i,j)=B_0(i,j)-X_k(i,j)$$

where i=The row index of 2D image.

j =The column index of 2D image.

$X_k(i,j)$ =Brightness value of a pixel at location (i,j) in operating image at time k.

$B_0(i,j)$ =Brightness value of a pixel at location (i,j) in the background image.

$Z_k(i,j)$ =Brightness value of a pixel at location (i,j) in the normalized image at time K.

In step 520, the gray scale data is compared to a threshold value to obtain a binary version of the gray scale data. The gray scale values of touch points are always greater than those of untouched areas. Gray scale data greater than the threshold value will be interpreted as a "1". Gray scale data less than the threshold value will be interpreted as a "0". Preferably, the threshold value is close to the minimum brightness value of the touch points, so that the entire area of a touch point is interpreted as a "1", while the untouched portions of the panels are interpreted as a "0". In step 530 the position coordinates of the centroids of any control objects in the CCD image are determined and stored.

In step 540, the position coordinates of control objects are compared to previous control objects to determine if they represent old objects that have moved or new objects that have newly appeared. To accomplish this, the distance between all new objects and all old objects is calculated. The positions of old objects is updated to that of the nearest new object, provided that they are within an acceptable distance. If no new object is within an acceptable distance, the old object is removed and a new object is entered. Finally, in step 550, the coordinates of any objects that have moved are changed, new objects are entered, and old objects no longer appearing are removed. The program then continues by looping to step 510. In the preferred embodiment the loop is fast enough to determine the proper correspondence of old and new objects and to provide a continuous display. For example, a refresh rate of 1/10 to 1/30 of a second is sufficient to provide a continuous display and to distinguish reasonably rapid finger movements.

Figure 18A:
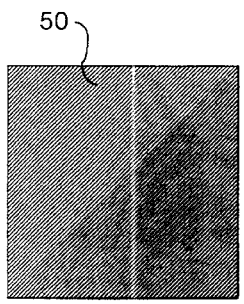
FIGS. 18a–18j provide data images and histograms in support of the explanation of steps 505–520 of FIG. 5.
Figure 18B:
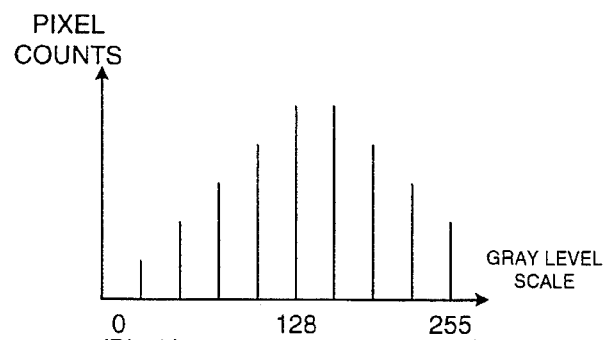
Figure 18C:
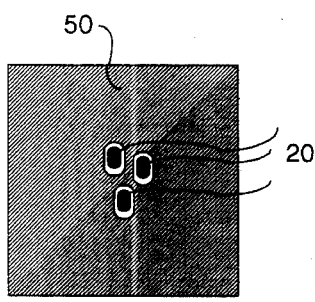
Figure 18D:
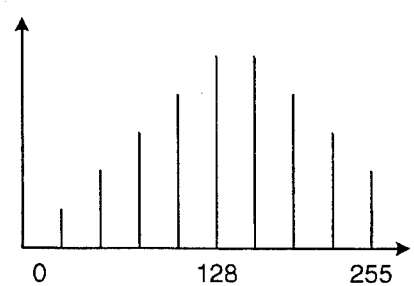
Figure 18E:
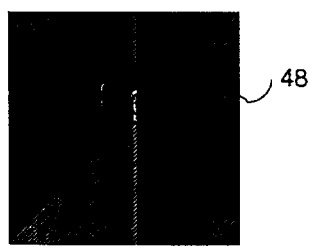
Figure 18F:
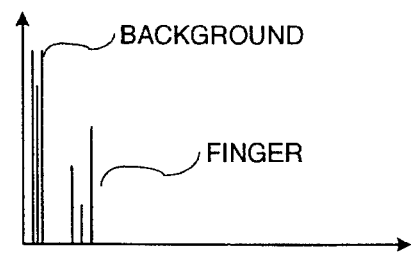
Figure 18G:
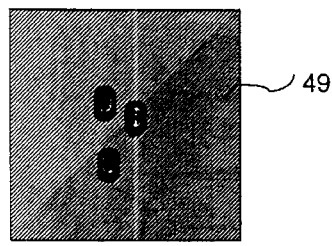
Figure 18H:
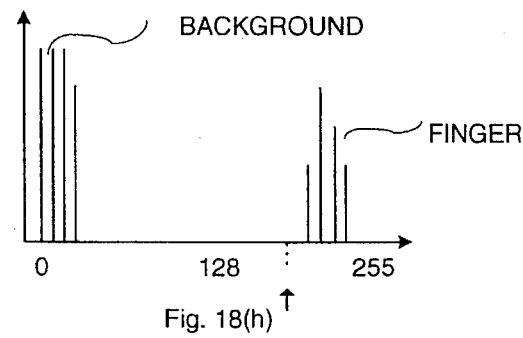
Figure 18I:
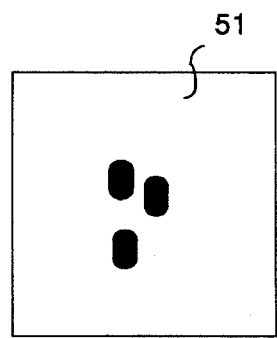
Figure 18J:
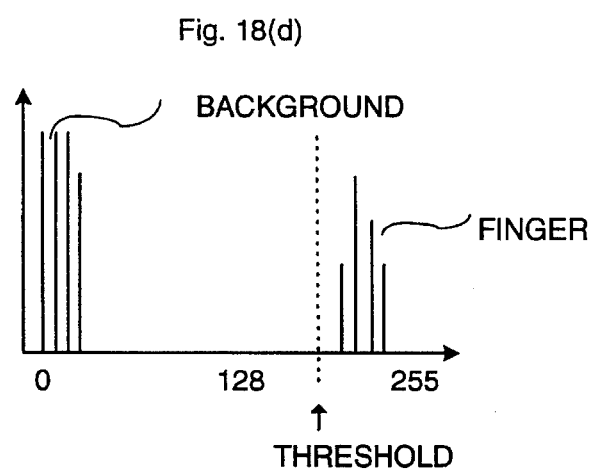

A further description of steps 505, 510, 515 and 520 is provided with reference to the images and histograms of FIGS. 18a–18j. FIG. 18a illustrates the CCD image 50 for step 505, such as from camera 210. FIG. 18b illustrates the corresponding histogram, where the y-axis indicates the number of pixel counts at each gray scale level and the x-axis indicates the gray scale level on a scale of 0–255. FIG. 18c illustrates the CCD image for step 510, showing three finger touch points 20, and FIG. 18d illustrates the corresponding histogram. FIG. 18e illustrates an image representation of the data resulting from the subtraction of image 18c from image 18a, corresponding to step 515. FIG. 18f provides the corresponding histogram. As illustrated, the digital values of the background and finger touches may be close to each other in value. If so, the preferred embodiment includes an additional step of autoscaling, which is accomplished by multiplying the gray scale levels of the pixels after the subtraction operation by a value sufficient to bring the finger touch points to near full scale. For example, if the maximum value for any finger touch points was 12, a multiplication factor of 20 would bring the maximum value to 240. This provides for a better separation between the finger and background data and facilitates the setting of a threshold level prior to step 520. FIGS. 18g and 18h illustrates the image data 49 and corresponding histogram after autoscaling. As suggested, this is an optional operation in the normalization step 515. Finally, FIGS. 18 illustrate the image 48 data and a corresponding histogram after step 520, wherein a threshold value is set between the gray scale values for the background and finger touch data and the data is digitized to a "0" or "1" value.

Figure 6:
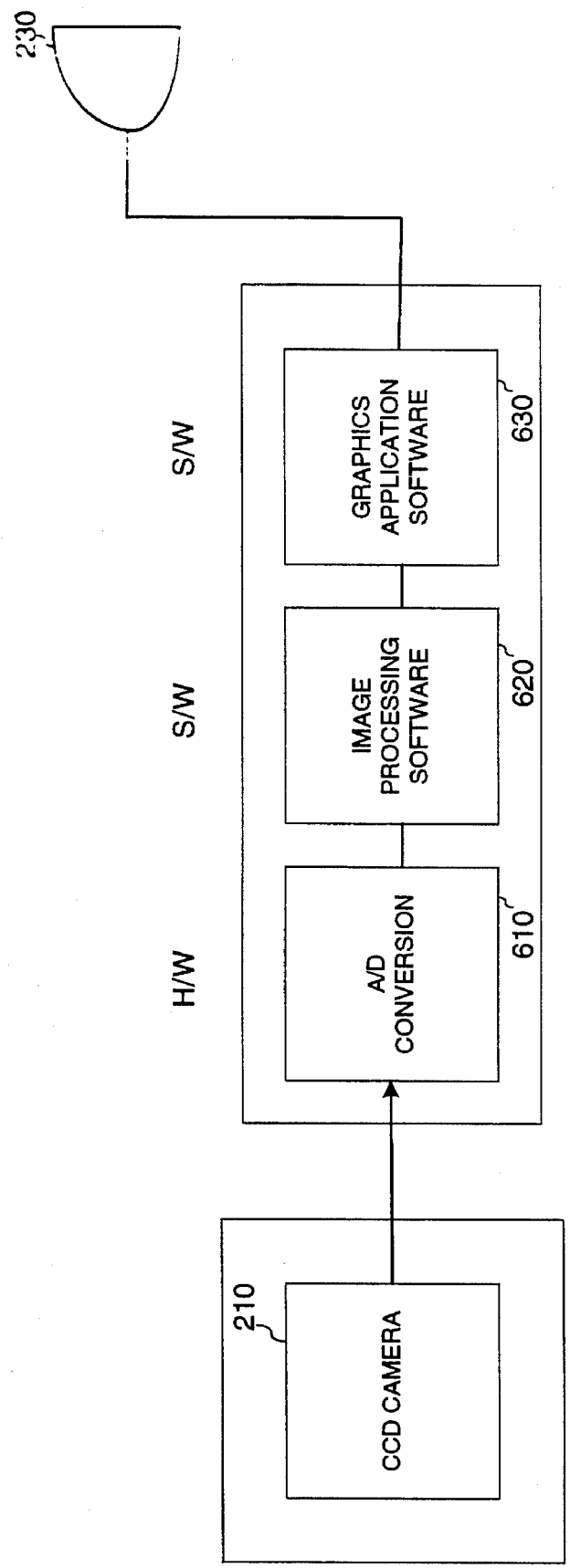

FIG. 6 provides a functional block diagram of the system of FIG. 2. As illustrated, CCD camera 210 provides a gray scale image to computer 250. Computer 250 includes an analog-to-digital converter 610 which converts the analog signal from CCD camera 210 to an 8-bit digital signal. Computer 250 also includes image processing software 620 for acquiring background and operating images, normalizing the operating images, and converting the gray scale image data to a two-level binary version by comparing the normalized gray scale data to a threshold value. This corresponds to steps 505, 510, 515 and 520 of FIG. 5. (The threshold value may be preset or adjustable.) Image processing software 620 also computes the centroids of the control objects and tracks the positions of control objects. This corresponds to steps 530, 540 and 550 of FIG. 5. The coordinates of all control objects are then provided to graphics application software 630 which generates a graphics display on display 270.

It is intended that graphics application software shall handle the coordinate transformation of control objects from the CCD image space (FIG. 3) to the graphics display image space (of display 270). The mathematical equations or tables for this transformation depend on the characteristics of graphics application 630. One method to perform the transformation is to use a table that transforms the image space illustrated in FIG. 3 into a controller space. Each position in the table would be indexed by the coordinates of the point in the image space and would include three data values. The first value would define one of the three panels. That is, either panel 202, 204 or 206. For example, the first value for image point 305 would correspond to panel 206. The first value for image point 310 would correspond to panel 204, etc. The second and third values would define the position of the touch point on the identified panel. For example, the second and third values for touch point 305 would identify the "Y" and "Z" coordinates of the touch point on panel 206. Similarly, the second and third values for touch point 310 would identify the "X" and "Z" coordinates of the touch point on panel 204. The second and third values for touch point 315 would identify the "X" and "Y" coordinates of the touch point on panel 202. This transformed object position data could then be used to determine the positions of the objects in the display space of display 270. This method could be incorporated into a ROM table in image processing software 620, which has the advantage of making the image space of FIG. 3 "transparent" to the applications programmer. That is, the programmer of graphics application software 630 would receive in:put directly identifying the panel and panel positions of control objects and would not have to compensate for the internal geometries of the controller. However, the graphics application software is likely to require an additional transformation into the display space. Accordingly, a single a transformation could be done directly from the image space to the display space. However, this transformation is dependent on the display characteristics of graphics application software 630, thus would have to be included in graphics application software 630.

Further, graphics application software 630 interprets the movement of the control objects as commands to gestures. This may be to provide commands such as those illustrated in FIGS. 4a–4c. Further, the number of touch points may provide additional command information. For example, one touch point may indicate a cursor movement command. Two touch points might indicate a slide or rotation command of graphics objects. Three touch points might provide a cancel or "UNDO" command. Four touch points may provide an erase screen command.

Steps 510–550 are illustrated in an image format in FIGS. 7a–7d. FIG. 7a illustrates the gray scale image received by computer 250 from CCD camera 210. As illustrated, this is in the "camera" image space. The image of FIG. 7a corresponds to the image data after step 515. The image of FIG. 7b corresponds to the image data after it is digitized in step 520. The position data of each object is retained, however the gray scale information is eliminated in response to the threshold value setting. The control objects in FIG. 7b are represented by "spots," such as control objects 705, 710, and 715, of varying size and shape. In FIG. 7c, each control object has been reduced to a single set of coordinates representing the centroids of the control objects, corresponding to step 530. Finally, in FIG. 7d, these coordinates are compared to the coordinates of existing control objects so as to determine which objects have moved to the new locations, corresponding to steps 540 and 550.

Figure 8A:
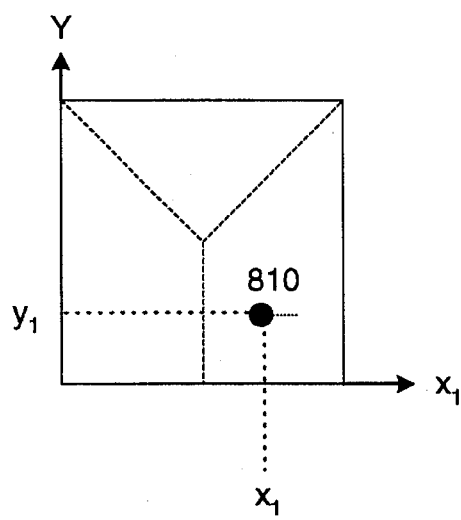
FIG. 8a–8b provides a graphical representation of how a graphical applications software might transform touch images from the camera image space into the display space.
Figure 8B:
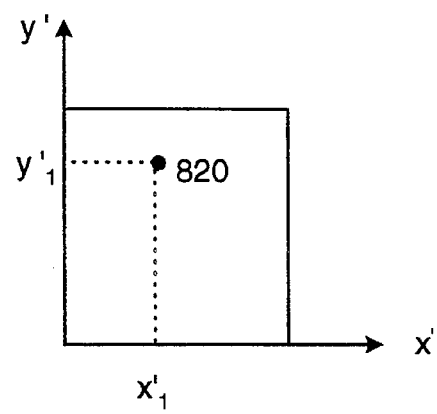

FIGS. 8a–8b provide a graphical representation of how a graphical applications software, such as software 630, might transform control objects images from the camera image space directly into the display space of graphics display 260. Specifically, the position of control object 810 is identified by its position in the CCD camera image space. This is transformed directly to a position 820 on graphics display 260 by an appropriate table or formula. For example, an image processing technique known as "warping" can be applied to transform the position coordinates 810 into position coordinates 820. Warping is the process by which one image is altered so that the spatial relationship of objects and features in a first image are aligned to a second image or spatial template. The warping transformation is given by the following polynomial equations:

$$X'=a1+a2*X+a3*Y+a4*X*Y+a5*X^2+a6*Y^2+\ldots$$

$$Y'=b1+b2*X+b3*Y+b4*X*Y+b5*X^2+b6*Y^2+\ldots$$

where X and Y are old coordinates and X' and Y' are the new coordinates. The coefficients a1, a2, ... and b1, b2, ... are determined to correspond to the desired mapping between the two images.

Control objects on panel 202 are thus interpreted directly as positions on the X-Y plane of graphics display 260. Thus, the position is mapped into the image space such that positions on the panels have a one-to-one correspondence with positions on graphics display 260. The mappings of touches on panels 204 and 206 may include three dimensional or "z" data for use in a perspective view of the three dimensional image on the two dimensional display.

Figure 9:
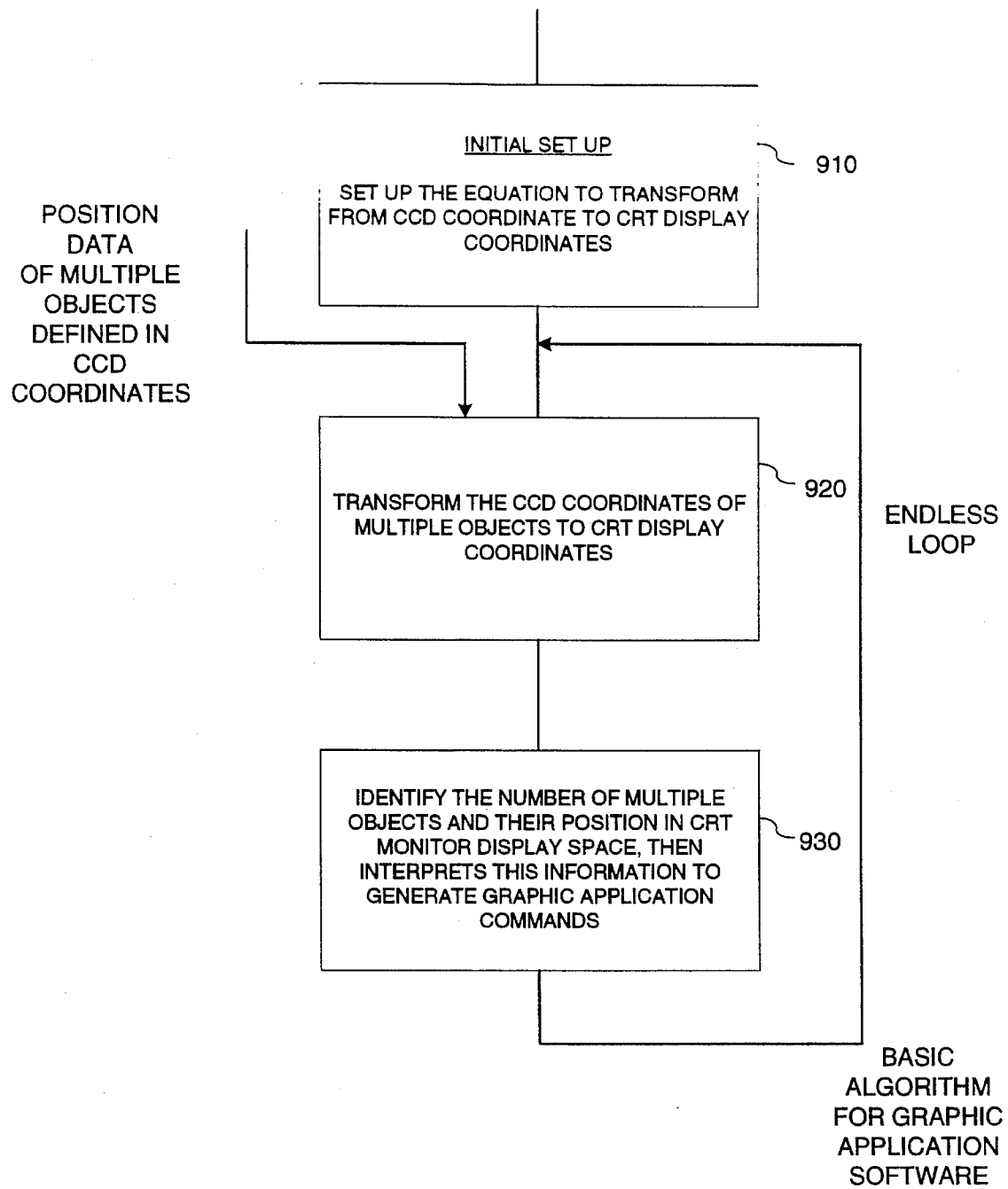
FIG. 9 is a further illustration_ of the steps of the image processing.

The flow of the image processing in graphics application software 630 is further illustrated in FIG. 9. In step 910, the basic equations and/or tables are set up for transforming the image space coordinates of the CCD camera to the display (or controller) coordinates. In step 920, the coordinates of control objects are transformed to the display (or controller) coordinates. Finally, in step 930, the number and position of the control objects are interpreted into specific commands.

Figure 10:
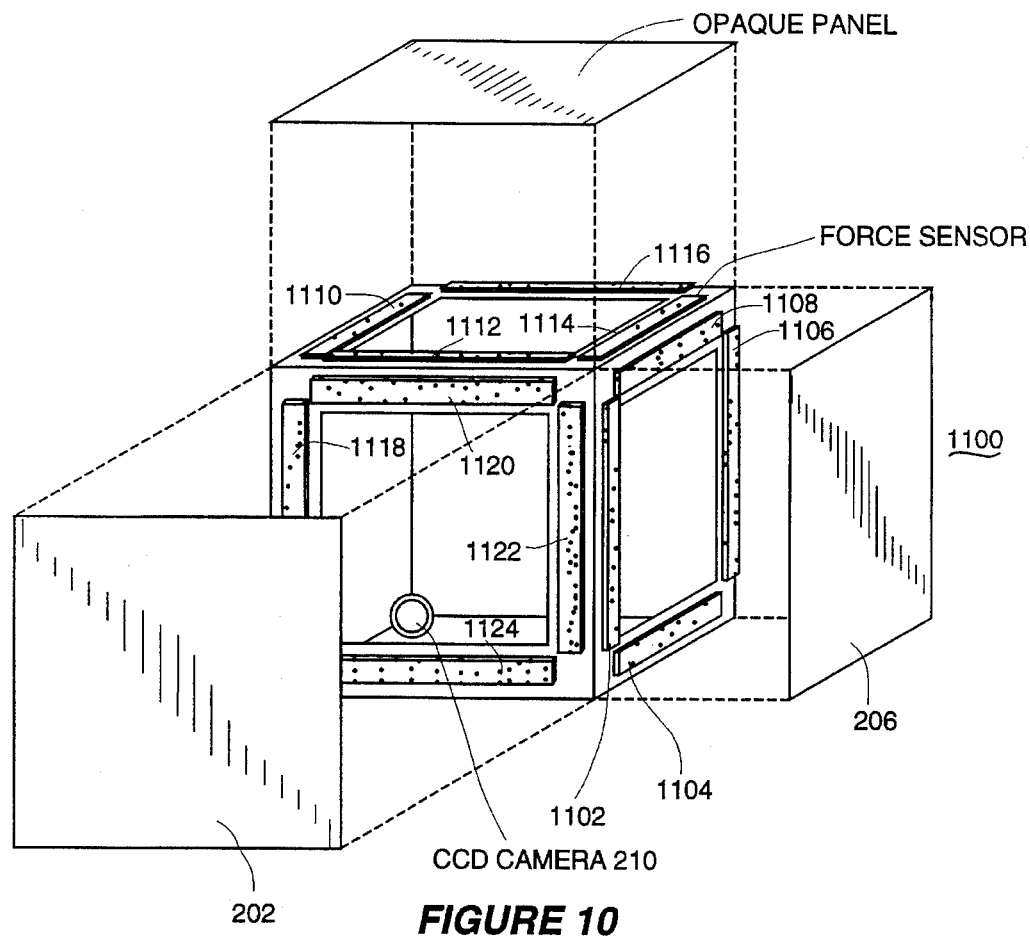
FIG. 10 illustrates an alternative embodiment that includes force sensors so as to sense the pressure applied to any of the panels.

FIG. 10 illustrates an alternative embodiment that includes force sensors so as to sense the pressure applied to any of the semi-transparent panels. Specifically, controller 1100 operates in a manner similar to controller 200, except that it further includes force sensors. Force sensors 1102, 1104, 1106, and 1108 monitor the force applied to panel 206. Similarly, force sensors 1110, 1112, 1114, and 1116 monitor the force applied to panel 204. Similarly again, force sensors 1118, 1120, 1122, and 1124 monitor the force applied to panel 202. Suitable sensors are available from Interlink Electronics, Carpinteria, Calif. Alternatively, suitable sensors distributed under the TouchSurface trademark are available from Intelligent Computer Music Systems, Inc. of Albany, N.Y.

Figure 11:
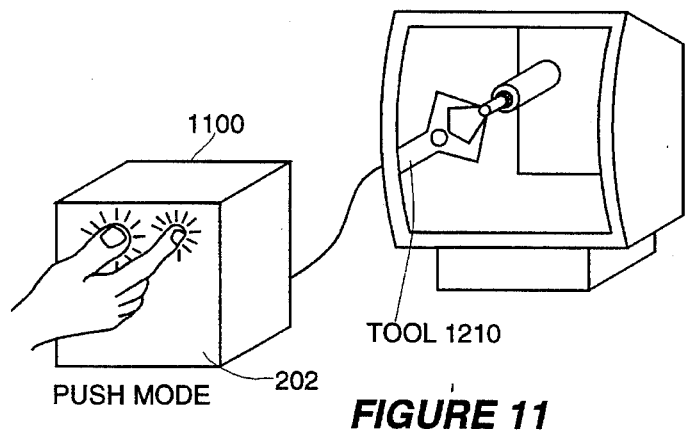
FIG. 11 illustrates the operation of the controller of FIG. 10 as an interface for a interactive computer graphics application.

Use of the outputs from the force sensitive sensors allows a sophisticated three-dimensional control, such as illustrated in FIG. 11. For example, pressure on panel 202 is interpreted to provide an apparent movement of tool 1210 (in a "-z" direction into the display) such that it could be rotated in the x-y plane in response to a rotation gesture of the control objects and simultaneously moved in the "-z" direction in response to the pressure detected by force sensors 1118, 1120, 1122, and 1124.

FIG. 12 illustrates a new input control technique for use with the graphical control devices taught herein, such as controller 100 illustrated in FIG. 1. As a background, input control devices for interactive computer graphics am often characterized by a figure-of-merit known as the control-to-display ratio, or "C/D". The C/D is the ratio between the hand or finger movement (the control) and the cursor movement (the display). A large C/D ratio allows for precise positioning of the cursor. However, large and/or rapid cursor movements are difficult to accomplish with controllers characterized by a large C/D. In contrast, a small C/D ratio allows for large and rapid cursor movements, but makes precise positioning of the cursor difficult. In order to overcome this problem of conflicting requirements, some relative position devices utilize variable C/D ratios which provide small C/D ratios in response to rapid controller movements and large C/D ratios in response to slow controller movements. This technique, which makes the C/D ratio a function of the velocity of the input device, is used on some mouse controllers. Proper set up can allow a user to position a cursor accurately across an entire CRT screen without repositioning his/her wrist.

However, such variable C/D devices have certain disadvantages. Specifically, one disadvantage of a variable C/D ratio device is that a user cannot slowly move the cursor accurately and continuously across the entire display without. repositioning his/her hand. In certain 3-D graphics applications, a user sometimes desires to accurately position and slowly control graphical objects entirely across the display to perform high precision manipulation without repositioning his/her hand or fingers. Accordingly, it is desirable to develop a interactive interface technique that simultaneously provides high precision and large and rapid movements.

FIG. 12 illustrates controller 100, also illustrated in FIG. 1. As illustrated, controller 100 is configured as a 6-DOF (Degree-Of-Freedom) controller for controlling a graphical object or cursor on a 2-D display, such as display 135 (also illustrated in FIG. 1 ). Thus, as discussed in regard to FIG. 1, controller 100 can simultaneously respond to multiple control objects (touch points).

As illustrated, a region 1205 is graphically provided on panel 105 of controller 100. Region 1205 on controller 100 is referred to herein as object manipulation region 1205. Object manipulation region 1205 corresponds to a graphically defined display region 1210 on display 135.

The user can manipulate any graphical objects (including the cursor) on display region 1210 by the use of control objects on object manipulation region 1205 as discussed above. There is a one-to-one correspondence between the points on object manipulation region 1205 and display region 1210. That is, the center of object manipulation region 1205 corresponds to the center of display region 1210, the top-left corner of regions 1205 corresponds to the top-left corner of region 1210, etc. Thus, if region 1210 is specified as a small area, a relatively large C/D results. This facilitates precise manipulation of any display objects that appear within display region 1210.

Further, display region 1210 can be quickly moved, or moved simultaneously with a manipulation of objects within display region 1210. Specifically, panel region 1220 outside of object manipulation region 1205 is used for movement of display region 1210 on display 135. Specifically, if a user touches in panel region 1220, the center of display region 1210 will move on display region 135 in the direction defined by a vector from the center of object manipulation region 1205 to the center of the touch in region 1220. For example, a touch in region 1220 above object manipulation region 1205, as illustrated in FIG. 11, will result in display region 1210 moving upward on display 135. By moving the display region, objects not previously within display region 1220 can be included within the region so that they can be manipulated. This provides the capability to quickly move display region 1220 so that any object on display 135 can be reached for manipulation. By simple using more than one finger, the ability to simultaneously move display region 1210 and to manipulate objects is provided. For example, an object could be slowly rotated and quickly moved to another point on display 135.

This cursor/object manipulation technique can also be applied in the x-z and y-z planes of a graphics application, thus could be used with other controllers, such as controller 200 illustrated in FIG. 2.

The operation of the interface technique of FIG. 12 is further illustrated in FIGS. 13a–13e. As illustrated in FIG. 13a, graphical objects 1305, 1310, 1315, 1320, 1325, and 1330 are displayed on display 135. Objects 1320, 1325, and 1330 are within display region 1210. Thus, objects 1320, 1325, and 1330 can be manipulated in response to touches on object manipulation region 1205 of controller 100. The objects in the display region 1210 are highlighted. Further, as illustrated in FIG. 12a, a touch to the left of object manipulation region 1205 on panel 105 results in display region 1210 moving to the left on display 135. FIG. 13b illustrates object 1320, within display region 1210, being rotated in response to a rotation gesture in object manipulation region 1205 on panel 105. FIG. 13c illustrates the upward movement of display region 1210 in response to a touch on panel 105 above the object manipulation region 1205. This permits the user to include object 1305 within display region 1210. FIG. 13d illustrates object 1305, now within display region 1210, being rotated in response to a rotation gesture in object manipulation region 1205 on panel 105. Finally, FIG. 13e illustrates a simultaneous interface technique wherein the user grasps object 1305 and simultaneously touches the area of panel 105 below and to the right of object manipulation region 1205. This causes object 1305 to be moved along with display region 1210 as display region 1210 moves downwards and to the right on display 135.

Figure 14A:
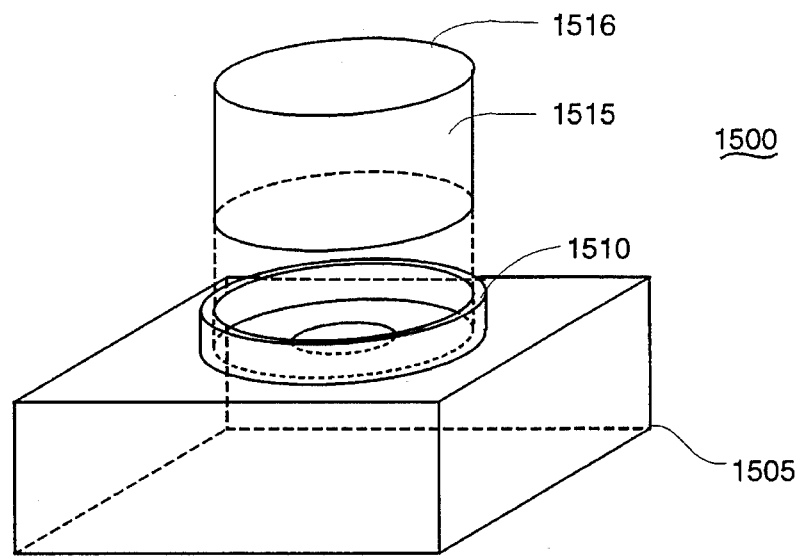
Figure 14B:
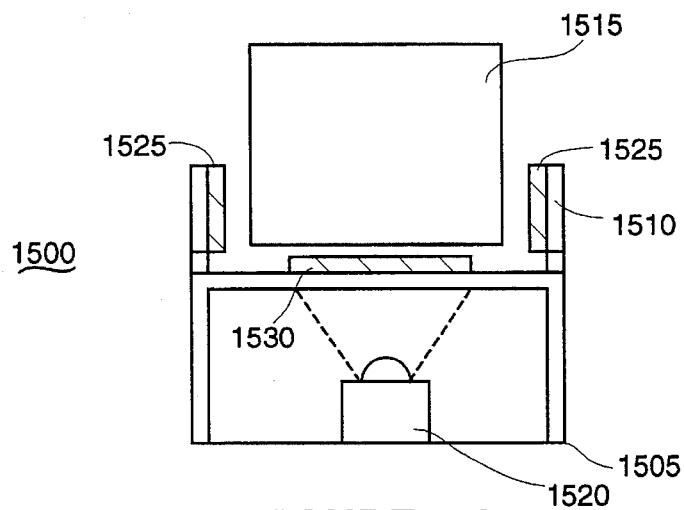
Figure 14C:
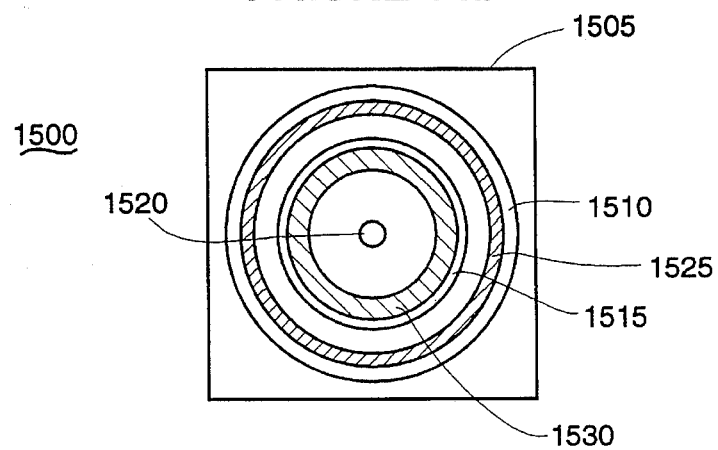

FIGS. 14a–14c illustrate a cylindrical controller built in accordance with the present invention. As illustrated, a graphics input controller 1500 includes an opaque base 1505, an opaque sleeve 1510, and a semi-transparent cylinder 1515. Cylinder 1515 includes a flat semi-transparent disk 1516 mounted on the top of the cylinder. Thus, controller 1500 is generally opaque except for semi-transparent cylinder 1515. Semi-transparent cylinder 1515 fits into sleeve 1510 as illustrated in FIG. 14b, a cross-section view of controller 1500. A compact CCD camera 1520 having a wide angle lens is mounted within enclosure 1505 and is oriented and focused so as to detect the shadows of objects, such as fingers, touching cylinder 1515.

In operation, controller 1500 operates in much the same manner as controller 100 of FIG. 1 and controller 200 of FIG. 2. Specifically, semi-transparent cylinder 1515 allows some light through, but do not generally allow through images of background objects. Thus, the cylinder diffuses light and generally provides a uniform gray image to CCD camera 1520. However, if a user touches an area or areas on the cylinder, the areas touched by his fingers appear black to CCD camera 1520 and can be readily distinguished from untouched areas which is illuminated by ambient light. Further, radial forces and axial forces applied to cylinder 1515 can be detected by force sensors 1525 and 1530 and the location of radial forces can be determined in response to the location of detected radial forces on force sensor 1525.

Figure 15:
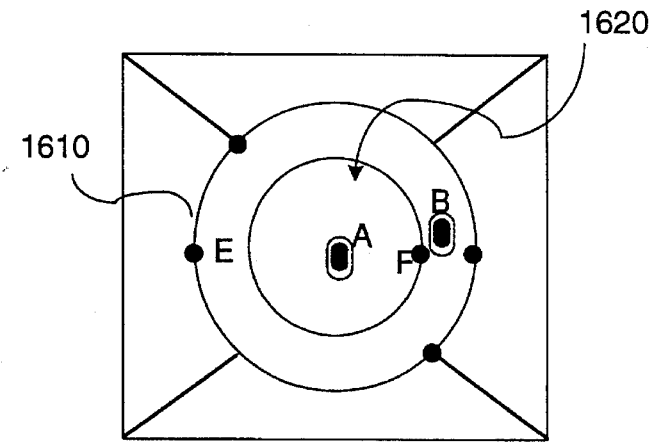
FIG. 15 illustrates a typical image from the CCD camera obtained from the controller illustrated in the configuration of FIG. 14.
Figure 16:
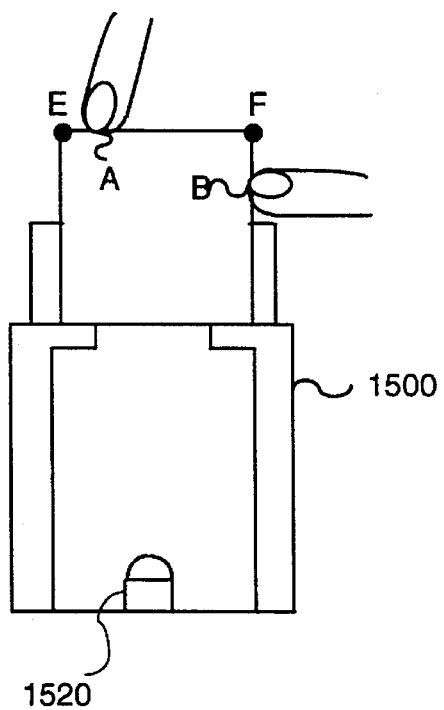
FIG. 16 illustrates the operation of the controller of FIG. 14 and shows the correspondence of points with the image of FIG. 15.

Further, controller 1500 includes two force sensors for detecting the magnitude of a force applied to cylinder 1515. Specifically, sensor 1525 is mounted between cylinder 1515 and sleeve 1510 and can detect the magnitude and the position of a force applied radially against cylinder 1515. Sensor 1530 is mounted between enclosure 1505 and cylinder 1515 to detect the magnitude of a force applied along the axis of cylinder 1515. FIG. 15 illustrates a typical image acquired from the CCD camera of FIGS. 14a–14c. Region 1610 corresponds to the image of the cylindrical sides of cylinder 1515. Region 1620 corresponds to the circular top of cylinder 1515. Spots and points A, B, E, and F correspond to the like-identified locations on FIG. 16, which illustrates the operation of controller 1500. Specifically, finger touches are identified as A and B, and the upper edge of cylinder 1515 includes points E and F.

In operation, a user can generate vertical (+z) position/manipulation commands by either dragging up on the surface of cylinder 1515 or by pushing down on disk 1516. Radial position commands can be generated by either pushing against cylinder 1515 or by dragging across disk 1516. Rotation commands about the z axis can be generated by either dragging horizontally on cylinder 1515 or by a twisting gesture on disk 1516.

Figure 17A:
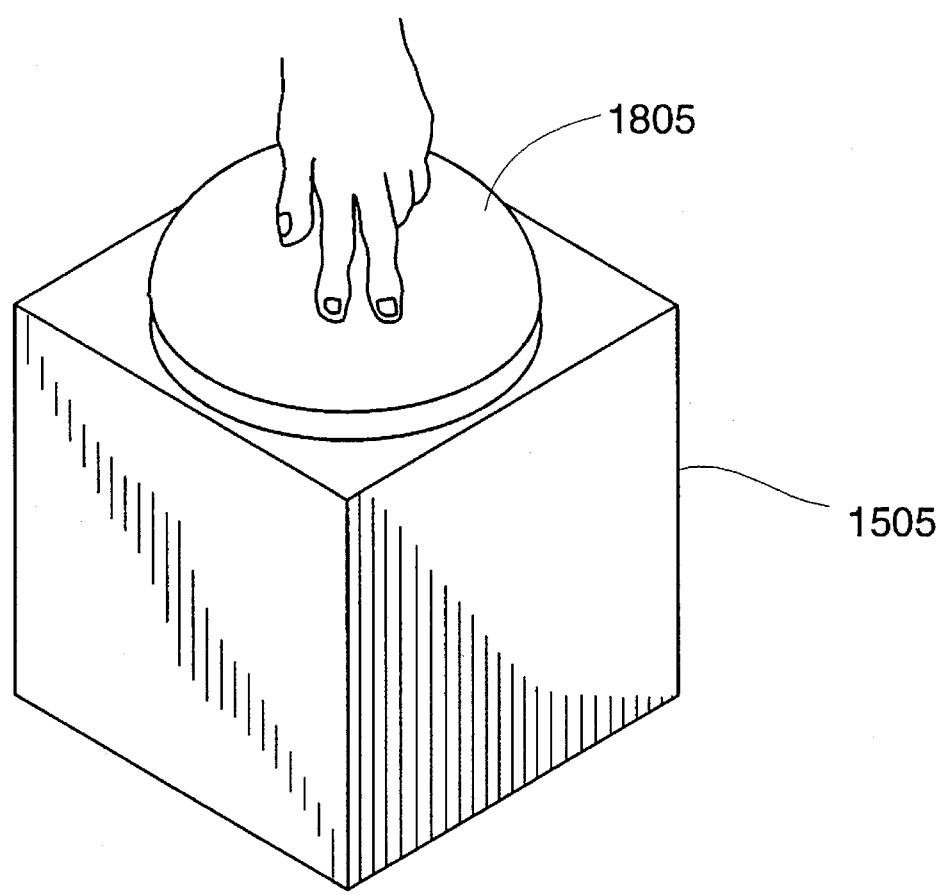
FIG. 17a is a perspective view of a hemispherical controller built in accordance with the present invention.

As illustrated in FIG. 17a, cylinder 1515 could be replaced with a hemispherical surface 1805, wherein the operation would be substantially unchanged from that described above.

Figure 17B:
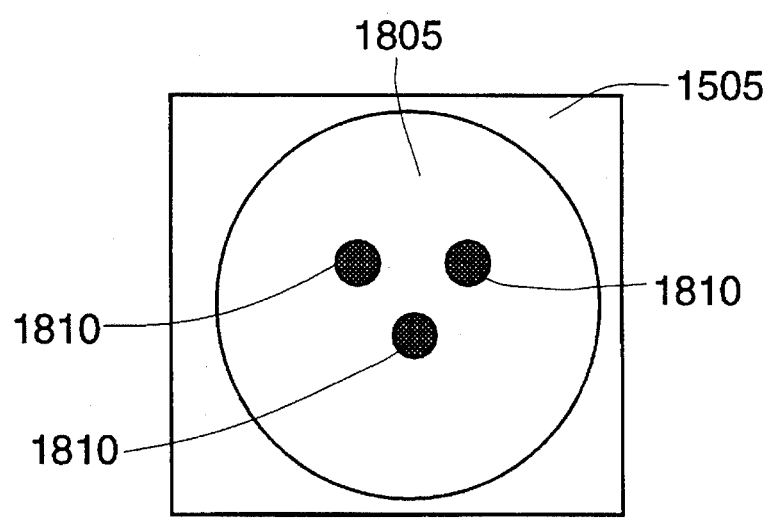

Hemispherical surface 1805 is particularly useful for generating rotation commands about arbitrary angles or axes in 3D space. For example, in virtual reality applications or in CAD/CAM systems, a user may need to rotate objects about arbitrary angles or axes. The cube, which has an intuitive shape for generating rotation commands about the reference axes (x, y, and z axes)in the Cartesian coordinate system, is not suitable for generating rotation commands about arbitrary angles or axes. However, the hemispherical shape is more natural and intuitive for generating such rotation commands. Specifically, rotation commands can be generated on an hemispherical surface by dragging a single finger in an arc or by a two finger gesture of "twisting" on the surface of the hemisphere. FIG. 17b depicts the shadow image of touch points 1810 on hemispherical surface 1805 as acquired by the compact camera. While the compact camera is continuously acquiring the shadow image of touch points, software computes the x-y coordinates of centroids corresponding to the "touch points." The x-y coordinates of the centroids are converted to Polar coordinates (r, theta) using the equations described below.

$$r = SQRT(x^2 + y^2)$$

$$theta = tan^{-1}(y/x)$$

The trajectories of touch points 1810 are then tracked in terms of radius (r) and angle (theta) to interpret the rotation commands. For example, FIGS. 17c–17g depict typical rotation commands entered by touch points on hemispherical surface 1805.

In FIG. 17c, the user is dragging his/her finger in a circle about the y axis. The trajectory of the touch point obtained by the CCD camera is arc of constant radius (r) and increasing angle (theta), as illustrated in the CCD image of FIG. 17d. A change of angle and constant radius is interpreted as a rotation command about y axis.

FIGS. 17e and 17f illustrate a rotation command about the x axis. Similarly, FIGS. 17g and 17h illustrate a rotation command about the z axis. In these cases, the value of radius (r) of the touch point varies while the value of angle is constant. This change of radius and constant angle is interpreted as a rotation command about the x or z axis.

Figure 17I:
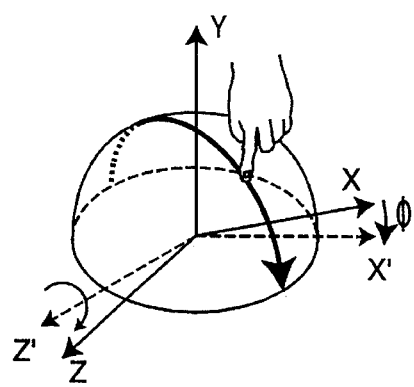
Figure 17J:
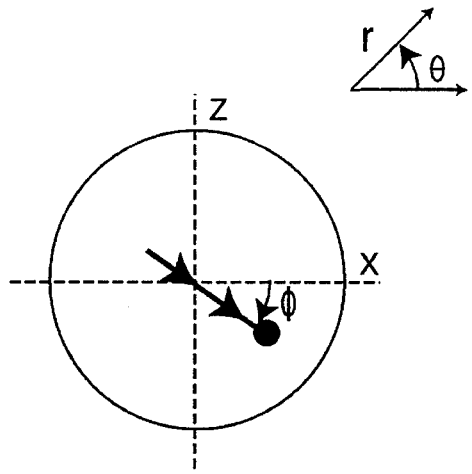

FIGS. 17i and 17h illustrate a rotation command about arbitrary single axis. In FIG. 17g, the user generates a rotation command about z' axis, where z' is shifted an angle of phi from the z axis. The trajectory profile (r, theta) illustrated in FIG. 17j is similar to that of FIGS. 17f and 17h, however the value of angle theta is shifted 90+phi.

Figure 17K:
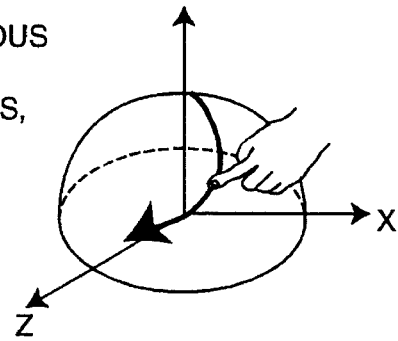
Figure 17L:
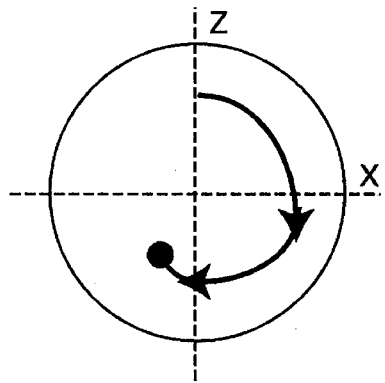

Finally, an arbitrary trajectory is illustrated in FIG. 17k and the corresponding CCD image is illustrated in FIG. 17i. FIG. 17k illustrates simultaneous rotation commands about x axis, y axis and z axis. In this case, both coordinates (r, theta) of the touch point changes continuously.

Figure 19:
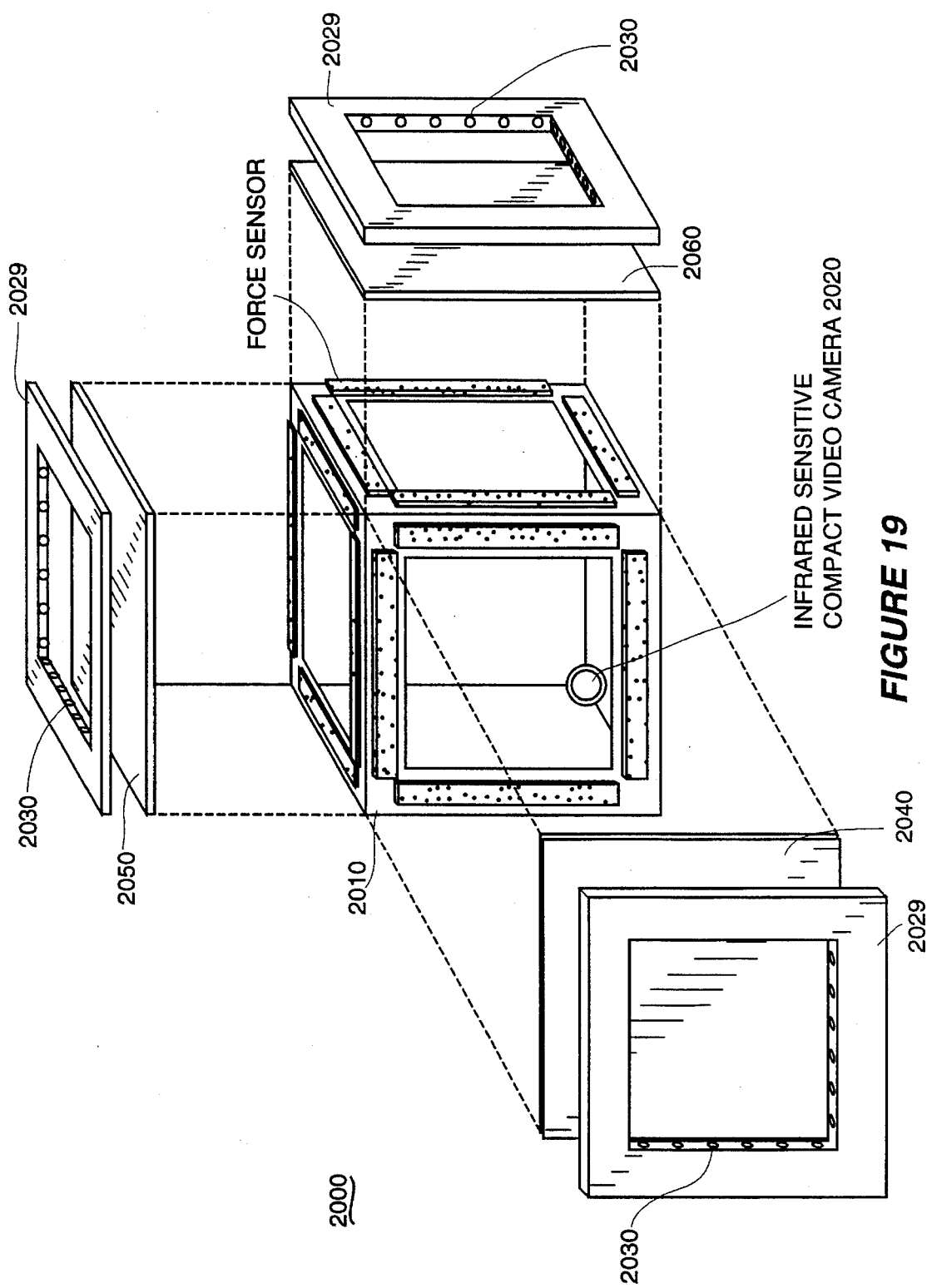
FIG. 19 provides an exploded perspective view of an infrared-based 6 degree-of-freedom controller according to the present invention.

Alternatively, the light source and semi-transparent panels can be made of infrared light emitting diodes (IR LED) and long pass glass filters, which reflect most visible light but allow transmission of infrared. FIG. 19 illustrates a 6 degree-of-freedom controller 2000 including an opaque enclosure 2010, a compact infrared-sensitive camera 2020, infrared LEDs 2030 an infrared light source frames 2029 and a three long pass glass filters 2040, 2050, and 2060. Force-sensors 2060 are optionally mounted between filters 2040, 2050 and 2060 and enclosure 2010 to detect forces on the filters. Visible light reflects from filters 2040, 2050, and 2060. However, infrared light, such as that from LEDs 2030, is transmitted through the filters. Infrared LEDs 2030 surround each filter to provide a uniform illumination on each filter. Thus, if the user touches a filter, such as filter 2040, the touch spot blocks the transmission of infrared light and this touch point will be detected by camera 2020. The operation of controller 2000 is similar to the operation of the white-light based systems described above with the advantage that the infrared-based controller 2000 is insensitive to ambient white light in the user's room which is a potential cause of error in the formation of the digitized "0" or "1")image.

Long-pass glass filters having a very low transmission in the shortwave region (i.e. visible light region) and high transmission in the longwave region (i.e. infrared light region) are commercially available. One such a filter, known as "black glass," is available from Rolyn Optics under stock number 65.1398 (stock number RG850.) This example has a transmission for visible light (390 nm–770 nm) of less than $10^{-3}\%$; a transmission of 50% at 850 nm; and a transmission of 97.5% at 900 nm. IR LEDs typically provide light in the 800 nm–1000 nm range with a peak intensity at 900 nm. Thus, stock number RG850 glass is ideally suited to differentiate ambient visible light from light generated by IR LEDs. The desired semi-transparent property of the long-pass filter is achieved by treatment of fine ground surface (single side) or a putting gray colored translucent film/sheet on the surface to provide the desired diffusion. Such a light diffusion sheet is distributed by Edmund Scientific Co., Barrington, N.J. under the LENSCREEN mark.

While the invention has been particularly taught and described with reference to the preferred embodiment, those versed in the art will appreciate that minor modifications in form and details may be made without departing from the spirit and scope of the invention. For example, the input control technique taught in association with FIGS. 11 and 12 could be used with input control devices other than rear screen video detection devices. For example, it could be used with a mouse or other input control device. As another example, the force sensitive pads as described in FIG. 10 could be used in the embodiment of FIG. 1, so that panel 105 did not have to be force sensitive, but a force applied to panel 105 could still be detected. Again, while the preferred embodiment has been taught with reference to a compact CCD camera, other types of imaging devices such as CMOS area sensors, infrared focal area sensors, or other equivalent imaging sensing devices could be used. Accordingly, all such modifications are embodied within the scope of this patent as properly come within my contribution to the art and are particularly pointed out by the following claims.

I claim:

1. A method for providing graphical input signals from an input device for an interactive computer system using an opaque enclosure with multiple semi-transparent light-diffusing panels disposed to form outside surfaces of the enclosure and an imaging device mounted relative to the panels for imaging the panels, the method including the steps of:

touching an outside surface of one panel;

imaging an inner surface of the panels with the imaging device;

acquiring a background image of the panels before touching the one panel; p1 normalizing the image signal in response to the background image;

providing an image signal in response to the image;

determining the coordinates of the image of the touch on the panel; and providing signals responsive to the coordinates to the interactive computer system.

2. A method as in claim 1 further comprising the step of digitizing the image signal into two values prior to determining the coordinates of the image of the touch on a panel.

3. A method as in claim 1 further comprising the step of tracking objects on the image of the panel.

4. A method for providing graphical input signals for an interactive computer system using an opaque enclosure with multiple semi-transparent light-diffusing panels and an imaging device disposed relative to the panels, the method including the steps of:

touching an outside surface of one panel;

imaging inner surfaces of the panels with the imaging device;

providing an image signal in response to an image of the inner surface of a panel;

acquiring a background image of the panels before touching the one panel;

normalizing the image signal in response to the background image;

determining the coordinates of the image of a touch on the panel;

transforming the coordinates into a three dimensional image in response to the coordinates; and providing a signal_representative of the transformed coordinates.

5. A method as in claim 4 further comprising the step of digitizing the image signal into two values prior to determining the coordinates of the image of the touch on the panel.

6. A method as in claim 4 wherein the steps of providing an image signal, and determining coordinates and transforming the coordinates are continuously repeated, and further comprising the step of tracking objects on the image of the panel.

7. A method for providing graphical input signals from an input device for an interactive computer system using an opaque enclosure with a semi-transparent light-diffusing panel and an imaging device disposed relative to the panel, the method including the steps of:

touching an outside surface of the panel;

imaging an inner surface of the panel with the imaging device;

providing an image signal in response to an image of the inner surface of the panel;

acquiring a background image of the panel before touching the panel;

normalizing the image signal in response to the background image;

determining coordinates of the image of a touch on the panel;

identifying a position on the panel which is touched in response to the coordinates; and providing a signal responsive to the coordinates to the interactive computer system.

8. A method as in claim 7 further comprising the step of digitizing the image signal into two values prior to determining the coordinates of the image of the touch on the panel.

9. A method as in claim 7 further comprising the step of tracking objects on the image of the panel.

10. A method for providing graphical input signals from an input device for an interactive computer system using an opaque enclosure with a semi-transparent light-diffusing panel and an imaging device disposed relative to the panel, the method including the steps of:

touching an outside surface of the panel;

imaging an inner surface of the panel with the imaging device;

providing an image signal in response to the image of the panel;

acquiring a background image of the panel before touching the panel;

normalizing the image signal in response to the background image;

determining coordinates of the image of the touch on the panel;

transforming the coordinates into a three dimensional image in response to the coordinates; and providing a signal responsive to the transformed coordinates.

11. A method as in claim 10 further comprising the step of digitizing the image signal into two values prior to determining the coordinates of the image of the touch on the panel.

12. A method as in claim 10 wherein the steps of providing an image signal, and determining coordinates, and transforming the coordinates are continuously repeated, and further comprising the step of tracking objects on the image of the panel.

* * * * *